United States Patent
Zhang et al.

(10) Patent No.: US 8,483,230 B1
(45) Date of Patent: Jul. 9, 2013

(54) PACKET SCHEDULE TIMESTAMP FOR A COMPRESSED BITSTREAM

(75) Inventors: Ji Zhang, San Jose, CA (US); Humphrey Hain-Ching Liu, Fremont, CA (US); John Jian-Gang Ding, San Jose, CA (US)

(73) Assignee: Software Site Applications, Limited Liability Company, Wilmington, DE (US)

( * ) Notice: Subject to any disclaimer, the term of this patent is extended or adjusted under 35 U.S.C. 154(b) by 0 days.

(21) Appl. No.: 13/365,640

(22) Filed: Feb. 3, 2012

Related U.S. Application Data

(62) Division of application No. 12/330,490, filed on Dec. 8, 2008, now Pat. No. 8,135,020, which is a division of application No. 10/339,742, filed on Jan. 9, 2003, now Pat. No. 7,486,680.

(60) Provisional application No. 60/367,398, filed on Mar. 21, 2002.

(51) Int. Cl.
*H04L 12/28* (2006.01)

(52) U.S. Cl.
USPC .............................. 370/395.64; 370/395.65

(58) Field of Classification Search
USPC .................. 370/356, 537, 395.64, 395.65
See application file for complete search history.

(56) References Cited

U.S. PATENT DOCUMENTS

| | | | |
|---|---|---|---|
| 5,602,920 A | 2/1997 | Bestler et al. | |
| 6,081,526 A | 6/2000 | Saeijs et al. | |
| 6,157,674 A | 12/2000 | Oda et al. | |
| 6,169,843 B1 * | 1/2001 | Lenihan et al. | 386/201 |
| 6,211,800 B1 | 4/2001 | Yanagihara et al. | |
| 6,434,146 B1 | 8/2002 | Movshovich et al. | |
| 6,504,996 B1 | 1/2003 | Na et al. | |
| 6,567,409 B1 | 5/2003 | Tozaki et al. | |
| 6,643,298 B1 | 11/2003 | Brunheroto et al. | |
| 6,654,389 B1 | 11/2003 | Brunheroto et al. | |
| 6,779,198 B1 | 8/2004 | Morinaga et al. | |
| 6,807,191 B2 | 10/2004 | Fujii et al. | |
| 7,145,912 B1 | 12/2006 | Schwartz et al. | |
| 7,349,386 B1 * | 3/2008 | Gou | 370/356 |
| 7,486,680 B1 * | 2/2009 | Zhang et al. | 370/395.4 |
| 7,593,433 B1 * | 9/2009 | Wu et al. | 370/537 |

(Continued)

OTHER PUBLICATIONS

Chiariglione, Leonardo, "MPEG-2 Generic Coding of Moving Pictures and Associated Audio Information", Oct. 2000, [online], [retrieved on Apr. 21, 2003]. Retrieved from the Internet <URL: http://mpeg.telecomitalialab.com/standards/mpeg-2/mpeg-2.htm >.

(Continued)

*Primary Examiner* — Albert T Chou
(74) *Attorney, Agent, or Firm* — Stolowitz Ford Cowger LLP

(57) ABSTRACT

A packet schedule timestamp is provided. A schedule information packet includes a packet schedule timestamp that represents the relative timing of data packets in a particular bitstream of a multiplexed transport stream. The schedule information packet further provides information about the timing of packets within a bitstream or multiple bitstreams before actual packet arrivals. Look-ahead processing techniques are provided to improve the efficiency of compressed bitstream storage and delivery, such as program stream to transport stream conversion and statistical multiplexing. The packet schedule information can be inserted into the bitstream it describes for transmission or storage with it. Other features, such as timing reconstruction, are also provided. The packet schedule information can be used to reconstruct the timing of the transport packets to their original state.

12 Claims, 17 Drawing Sheets

U.S. PATENT DOCUMENTS

| | | | |
|---|---|---|---|
| 8,135,020 B1 * | 3/2012 | Zhang et al. | 370/395.64 |
| 2001/0040903 A1 | 11/2001 | Negishi et al. | |
| 2001/0055316 A1 * | 12/2001 | Lerman et al. | 370/470 |
| 2003/0185238 A1 * | 10/2003 | Strasser et al. | 370/473 |
| 2005/0036763 A1 | 2/2005 | Kato et al. | |

OTHER PUBLICATIONS

Stolowitz Ford Cowger LLP; Related Case Listing; Jan. 30, 2012; 1 Page.

* cited by examiner

PACKET SCHEDULE TIMESTAMP FOR A COMPRESSED BITSTREAM

RELATED APPLICATION

The present application is a divisional of U.S. patent application Ser. No. 12/330,490, filed Dec. 8, 2008, now issued as U.S. Pat. No. 8,135,020, which is a divisional of U.S. patent application Ser. No. 10/339,742, filed Jan. 9, 2003 now issued as U.S. Pat. No. 7,486,680, that, in turn, claims priority under 35 U.S.C. §119(e) to U.S. provisional patent application Ser. No. 60/367,398, filed on Mar. 21, 2002, entitled "Efficient Packet Timestamping," all of which we incorporate by reference in their entirety.

TECHNICAL FIELD

This invention relates generally to digital video systems and, more particularly, a packet scheduling timestamp for providing and for encoding relative packet timing information for a compressed bitstream.

BACKGROUND

Audio-visual information can be digitized, compressed, and converted to formats suitable for computer and digital communication network transport and storage. Digital video compression techniques are widely recognized as an effective way to reduce the amount of data required to represent a video signal. Typical compression and delivery standards, such as Moving Picture Experts Group (MPEG) have an adjustable level of video quality and data usage trade-off. In addition, a compressed video signal can be treated just like other data that represents text, images, audio, database records, etc. As a result, multiple data types can be transported together over computer and communication networks and can be presented digitally to personal computers, televisions, or other display devices.

One problem with delivering compressed video is ensuring proper presentation of the video signal. Although compressed video can be delivered concurrently with other data, certain timing requirements are needed to ensure proper display of the video or audio-visual information. Because of the real-time nature of a video signal, video frames are presented to the decoder and display device in a periodic fashion. Further, compressed digital video data, when measured in bits per second (i.e., bit rate), has a highly variable nature. Specifically, the digital compression process removes temporal and spatial redundancy from the video images. As an example, in the MPEG video compression format, a video signal is encoded into three types of frames: I (intra), P (predictive) and B (bi-directional) frames. An I frame video picture is encoded as a stand-alone image, P frames or B frames are encoded via the motion compensation method, in which only the difference between video frames are encoded. Further details of the compression process can be found in MPEG standards documents, for example, "Generic coding of moving pictures and associated audio information: Video," available from the International Organization for Standardization (ISO/IEC), document no. 13818-2:2000. As a result of the compression process, video frames are encoded into data units with different sizes. Typically, I frames have more data than P or B frames. Therefore, if the compressed video data is transmitted over a communication channel at a constant bit rate, the encoded video frames will arrive at the decoder in non-uniform time intervals.

One approach for ensuring proper presentation of the video signal is using a data buffer to absorb the variation in size of encoded video frames. To complement the compression and encoding standards, decoder standards have been established to ensure that a compliant decoder can process video data (i.e., a bitstream) that complies with the MPEG specification. For example, in the MPEG digital video specification, the standards-compliant decoder has some precisely defined parameters, such as buffer size, how coded video frames are delivered to and from the buffer, how coded video frames are extracted for display, and how the decoder constructs the local timing clock. Defining parameters such as buffer size and timing ensures that application specific integrated circuits (ASICs) designed to decode compliant bitstreams are interoperable. Buffer exceptions, however, are to be avoided for proper decoder operation. A buffer exception typically includes buffer overflow or underflow conditions, which result in dropped frames or corrupted data. For proper presentation, therefore, the video data arriving at the decoder needs both data integrity and time integrity to avoid causing buffer exceptions.

Other problems such as latency are associated with extensive data buffering. As described above, video picture data is properly decoded and presented at regular intervals (e.g., 30 frames per second in NTSC television format). Buffering can be required at both ends of the communication channel to ensure proper presentation. The amount of buffering can depend on bit rate variation, such as the variation of the data size for each coded video frame described above, and the amount of buffering can be different for different bitstreams. For example, if one variable bit rate (VBR) transport stream has a duration of 100 minutes, with an average bit rate of 4 Mbps, a constant bit rate (CBR) communications channel with 4 Mbps data throughput can transport the video signal provided buffering is used to absorb the bit rate fluctuation from average. Specifically, if the first 50 minute segment of the 100 minute video is at 7 Mbps and the second 50 minute segment of the video is at 1 Mbps, the average bit rate is 4 Mbps. But if a 4 Mbps channel is used to transmit the bitstream, for the first 50 minutes, the buffer before the channel transmission would have to be at least 1.125 Terabytes ((7 Mbps-4 Mbps)*50 minutes*60 seconds). Further, the decoder buffer at the far end of the channel expects 30 coded frames to arrive but will not receive all of them because they have not all arrived yet in the deep buffer. A long initial delay is therefore required to avoid a decoder buffer exception.

Another problem with compressed video delivery is providing decoder compliant bitstreams. A bitstream that does not cause buffer exceptions at a standards-compliant decoder is called a decoder compliant bitstream. Network transport characteristics become a factor that can affect the compliance of the compressed video bitstream arriving at the decoder. That is, variable delay in the communications system or other data transport problems can transform a bitstream that is decoder compliant at the near end of the communications channel into a non-compliant bitstream at the far end (e.g., an integrated receiver/decoder).

A further problem with delivering a decoder compliant bitstream occurs when a multiple program transport stream is demultiplexed. For example, in MPEG-2, a typical multiple program transport stream combines several CBR or VBR packetized elementary streams (PES). The data associated with each individual PES bitstream is distinguished by a packet identifier (PID) in the composite transport stream. The use of the PID field allows a transport stream of different programs to be logically separated from each other, yet multiplexed temporally into a single transport stream. A statistical multiplexer (statmux) can be used to allocate transport bandwidth efficiently among VBR streams. For example, if video program A contains a flat background, while at the same time video program B contains high-motion content with more textural details, more bits will be used to code frames from program B than frames from program A. As a result, if one considers video program A or B by itself, the resulting MPEG-2 transport stream will be VBR. A PID stream that is extracted out of a statmuxed transport stream is decoder compliant as long as packet presentation timing is not changed. Timing implies that the inter-arrival times between any two consecutive transport packets of the same PID must be the same whether they are part of the statmuxed transport stream or being extracted out of the statmuxed transport stream and presented separately. When the statmuxed transport stream is delivered to a decoder, the decoder selects data packets having a particular PID (or set of PIDs) and discards or ignores other packets. When a PID stream has been extracted or delivered separately from a multiplexed transport stream, however, the packet delivery timing may be no longer the same. For example, these packets may be uniformly presented by the multiplexing process, but after demultiplexing, there may be some intermediate buffering that causes the packets to be delivered in a bursty fashion to the decoder. Bursty delivery can cause undesirable buffer exceptions.

FIG. 1 further illustrates the problem. In FIG. 1, a typically statistically multiplexed transport stream 120 is shown. Packets corresponding to video 1 105, video 2 110, and video 3 115 are illustrated as part of a multiple program transport stream 120. Packets that correspond to the packet identifier (PID) of video 1 105 are extracted from the statmuxed transport stream 120. The relative timing of packets from the same video program is shown to be variable 125. This relative timing is called the packet schedule. The packet schedule reflects the variable nature of the encoded video data stream. However, extracting video 1 105 and transporting it, for example, over a CBR channel as a separate bitstream 130 can make the packet inter-arrival times or "spacing" uniform, which changes the packet schedule or presentation timing. More generally, any transport of video 1 105 may not necessarily preserve the original packet schedule either due to additional buffering or further multiplexing with other packets in a different network node or system entity. As described above, the changed packet schedule can cause buffer exceptions at the decoder.

One conventional approach to preserving the relative timing of data packets within a bitstream when demultiplexing is to replace data packets in the multiple program transport stream that are associated with other bitstreams with null packets to maintain the relative timing of the extracted bitstream. That is, the null packets take up space in the resulting transport stream to ensure proper arrival timing of the data packets at a decoder or other system entity. Null packets, however, consume additional resources and introduce further content storage or delivery inefficiencies. For example, when extracting a VBR bitstream having an average bit rate of 3.5 Mbps and a peak bit rate of 9 Mbps, inserting null packets to ensure proper timing results in a bitstream having an average bit rate of 9 Mbps. Quantitatively, this represents an inefficiency of about 61%.

Another conventional approach to preserving the relative timing of the data packets within a bitstream when demultiplexing is to append an additional timestamp to each packet. Specifically, a timestamp that describes the correct current time instance of the packet can be coded as an additional field and added to the beginning (or the end) of the packet. These timestamps can then be delivered together with the packet through the network. A downstream system entity needs to be able to recover the timing of the packet. The system entity can do so by inspecting the timestamp on each packet. This approach is more efficient than the null packet insertion approach described above because a timestamp generally takes fewer bits than the original packet. For example, for an MPEG-2 transport packet, which includes 188 bytes per packet, a timestamp can be a 42-bit field. A 42-bit timestamp can be described by a 6 byte data field (rounding to 8-bit byte boundary preserves the byte boundary for the entire packet with the timestamp). Therefore, the approach would have an inefficiency of about 6/(188+6)=3%. This approach does have an additional limitation: the resulting packet format is no longer compatible with the original packet format. In the case of an MPEG-2 transport packet, the original 188 byte packet format is extended to a 194 byte packet format, which is not a standardized packet format. Unless all network transport systems are manufactured by the same vendor or support the same packet formats, the non-standard transport stream can no longer be transported over the network. Therefore, this approach may be useful for local storage and time reconstruction but not for interoperable long distance transport.

What is therefore needed is a packet schedule timestamp that: (1) encodes the bit rate profile or relative timing of data packets within a bitstream; (2) ensures timely delivery and presentation of a bitstream without long latency or buffer exceptions; and (3) preserves the relative timing of data packets within a bitstream without introducing inefficient null packets or an incompatible packet format.

SUMMARY OF THE INVENTION

One embodiment of the present invention provides a packet schedule timestamp for characterizing packet arrival times for one or multiple data streams ahead of the actual packet arrivals. For a variable bit rate (VBR) transport stream to be transported independent of its original multiplexing schedule, the packet schedule should be preserved. The packet schedule can then be used by a system entity to reproduce properly the VBR bit rate profile to avoid buffer exceptions. According to one embodiment, a packet schedule timestamp includes bit pattern data, in which each bit position corresponds to a packet slot of a transport stream. A binary "0" can be assigned for the packet slot when the packet slot does not contain a transport packet that corresponds to the packet identifier of the data stream of interest (i.e., the selected PID stream). A binary "1" can be assigned to a bit position when the packet slot contains the packet identifier of the data stream of interest. The bit pattern data, therefore, characterizes the relative timing of the packets for the data stream of interest.

In another embodiment of the present invention, the packet schedule timestamp can be formatted into a schedule information packet (SIP). To maintain compatibility with the MPEG-2 transport stream data format, the SIP uses the same transport packet format. By using the same transport packet format, a downstream network node or system entity can choose to deliver the SIP with the rest of the data packets transparently or to utilize the information contained in the SIP. For example, a multiplexer can make use of the packet schedule timestamp encoded in an SIP to characterize packet arrival times ahead of actual packet arrivals.

In a further embodiment, the packet schedule timestamp can be provided as program service information (PSI) private data fields. Messages can be inserted into a transport stream to carry signaling information such that system entities are aware of the packet schedule timestamp. In addition, the PSI can be used to describe to system entities which packet identifier (PID) contains SIP data. Upon receiving these messages, the system entity can then identify, for example, the packet identifier (PID) of the transport packet carrying the SIP.

In another embodiment, a schedule information packet generator is provided. The SIP generator includes a buffer, packet inspector module, formatter module, and inserter module. The buffer is used as a queue for the packets from a multiplexed transport stream. The packet inspector module examines the packet identifiers of each packet in the buffer to determine the bit pattern description for the data stream having selected packet identifier. The formatter module generates other SIP data field and formats the bit pattern and other data fields into an SIP payload. The inserter module inserts one or more SIPs into the multiplexed transport stream. A corresponding method for generating a schedule information packet is also provided.

In a still further embodiment, a digital video format converter is provided. One embodiment includes an MPEG program stream to transport stream converter. A program stream is designed for use in a reliable network and storage environment, while a transport stream is intended primarily for real-time and possibly unreliable transmission of compressed data over networks. A VBR program stream can be converted to a transport stream including SIPs to preserve the relative packet timing. This avoids causing buffer exceptions at a receiver decoder. The program stream can be converted to a CBR transport stream at bit rate R, which is the peak bit rate of the program stream. In one embodiment, null packets are added to preserve the packet arrival timing during conversion. An SIP generator is then used to generate SIPs for the packets of the CBR transport stream. After the timing of the packets has been characterized, the null packets are removed to produce a converted transport stream that includes packet schedule information. In another embodiment, null packets are not added, but the positions are computed or recorded. The SIP generator then uses the information about where null packets are needed to generate the appropriate SIPs. In this case, a converted transport stream can be produced without even temporarily introducing null packets in the data stream.

In yet another embodiment, timing recovery and traffic engineering features are provided. The SIP allows for removal of uninteresting transport packets from a multiplexed transport stream without losing the packet scheduling information or causing compatibility problems with existing compression or delivery standards. Uninteresting transport packets include, for example, null packets and other transport packets not intended for the receiver. An example of other packets that are not intended for the receiver include video/audio packets for a program or channel that is not selected for delivery to a particular receiver. The removed packets can be labeled as "0" bits in the SIP payload. Because of the removed packets, the remaining packets, which are labeled as "1" bits in the SIP payload, can be saved in a transmission buffer. As the remaining packets are delivered out of the buffer to the network, they will be closer in time than they were before the uninteresting packets were removed. The temporal position of removed packets (pattern "0" packets) can be restored in relation to selected packets (pattern "1" packets) to produce, for example, a decoder compliant bitstream. For traffic engineering features, a packet schedule timestamp can be received at a given point of reference before the packets described by the SIP are delivered or transmitted. A point of reference can be where the stored transport packets are to be delivered to an output module for real-time delivery, or to be delivered to a real-time multiplexer. Look-ahead principles can be applied to multiplexer algorithms that take the bit usage assignment between different channels or data streams into consideration to produce high presentation quality within the channel capacity constraints.

Further features of the invention, its nature and various advantages will be more apparent from the accompanying drawings and the following detailed description.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein.

Rather these embodiments are provided so that this disclosure will be thorough and complete and will fully convey the invention to those skilled in the art. For example, although embodiments of the present invention are described herein in an MPEG-2 compressed video environment, one skilled in the art will appreciate that the principles of the present invention apply broadly to data storage and delivery systems using various packet structures. One skilled in the art will further appreciate that methods, apparatus, systems, data structures, and computer program products implement the features, functionalities, or modes of usage described herein. For example, an apparatus embodiment can perform the corresponding steps or acts of a method embodiment.

A. System Level Data Format

Figure 1:
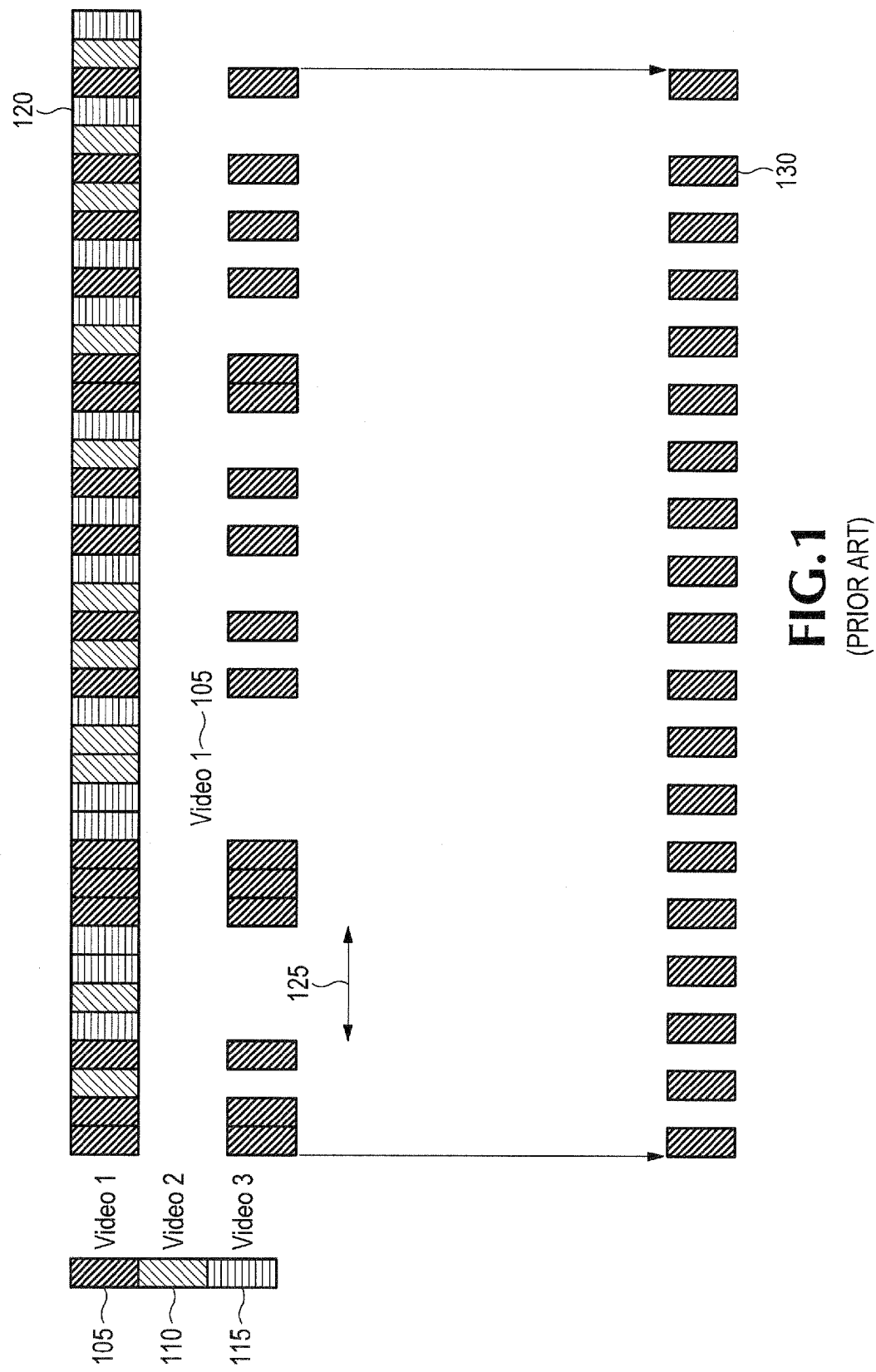
FIG. 1 is a prior art illustration of a statistically multiplexed compressed video transport stream.
Figure 2:
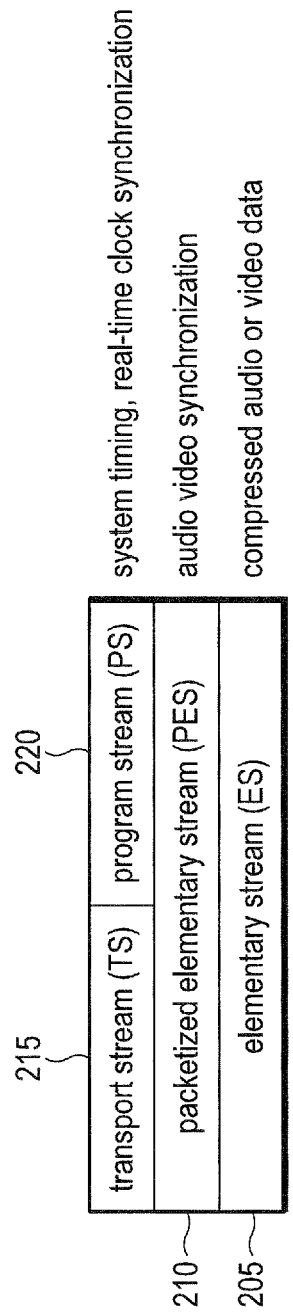
FIG. 2 is an illustration of an MPEG-2 data structure.

FIG. 2 is an illustration of an MPEG-2 data structure. The layered structure includes elementary stream (ES) 205, packetized elementary stream (PES) 210, transport stream (TS) 215, and program stream (PS) 220. Elementary stream 205 forms the basic data construct for compressed video and audio data. For video data, elementary stream 205 defines the syntax for aspects of the video compression data format. These include motion vectors, macroblock level data, discrete cosine transform (DCT) coefficients, and quantization scale factors. The data is organized for decoding into two-dimensional image data. A similar syntax construct is defined for audio data as well except that the data structure is for one-dimensional audio data samples. Elementary stream 205, however, does not contain timing information for ensuring proper synchronization of audio and video data at the receiver decoder. To achieve synchronized presentation, data from the elementary stream 205 becomes the payload of the packetized elementary stream 210, which includes additional information. Packetized elementary stream 210 appends presentation and decoding timestamps to data in elementary stream 205. These timestamps define the relative timing between video and audio frames, as well as the timing for decoding and displaying of video and presentation of audio at the receiver. The presentation timestamp ensures that audio and video data is synchronized and maintains fluid, real-time decoding of audio and video frames. However, the packetized elementary stream 210 only maintains the synchronization between audio and video frames, assuming that the decoder real-time clock is synchronized to the source clock. To synchronize the decoder and the source clock, transport stream 215 contains program clock reference (PCR) fields. A PCR is a 42 bit field within a transport packet of transport stream 215 that is used to adjust periodically the decoder clock so that the decoder clock tracks that of the encoder (source) clock with high accuracy.

Similar to transport stream 215, program stream 220 is another system layer format. However, the format of program stream 220 is different from transport stream 215. Program stream 220 is designed for use in a reliable network and storage environment, while transport stream 215 is intended primarily for real-time and possibly unreliable transmission of compressed data over networks. Program stream 220 and transport stream 215, however, share the same underlying data, namely packetized elementary stream 210 and elementary stream 205. Applications of program stream 220 include digital versatile disc (DVD) and other storage-based video servers. Transport stream 215 is generally used for real-time network based video transport, such as digital cable, direct satellite broadcasting (DBS) and terrestrial digital television. As described in further detail below, an embodiment of the present invention includes a method for converting program stream 220 into transport stream 215.

In addition, transport stream 215 allows for multiplexing multiple audio and video programs into a single bitstream. A program refers to a collection of video, audio, or data that shares a common timebase. An example program is a video television signal that has two associated audio tracks (e.g., English and Chinese) and some auxiliary data services. If transport stream 215 contains only a single program, it is a single program transport stream (SPTS). Otherwise, transport stream 215 is a multiple program transport stream (MPTS). Therefore, an SPTS contains only a single timebase, which is represented by a continuous series of PCR timestamps (e.g., at least 10 times per second). Similarly, an MPTS contains more than one timebase, which is represented by one independent continuous PCR timestamp for each program.

Transport stream 215 uses packet identifier (PID) fields to identify logically between programs. That is, transport packets having the same PID are directed to the same decoder receiver for presentation. A PID stream refers to those transport packets within an SPTS or MPTS that have the same PID assignment. Therefore, a PID stream is a subset of packets within, for example, transport stream 215. The packet order within the PID stream is identical to the order of the original transport stream and is not altered, nor is the PID value altered during transport.

B. Bit Pattern Description of Relative Packet Timing

Figure 3:
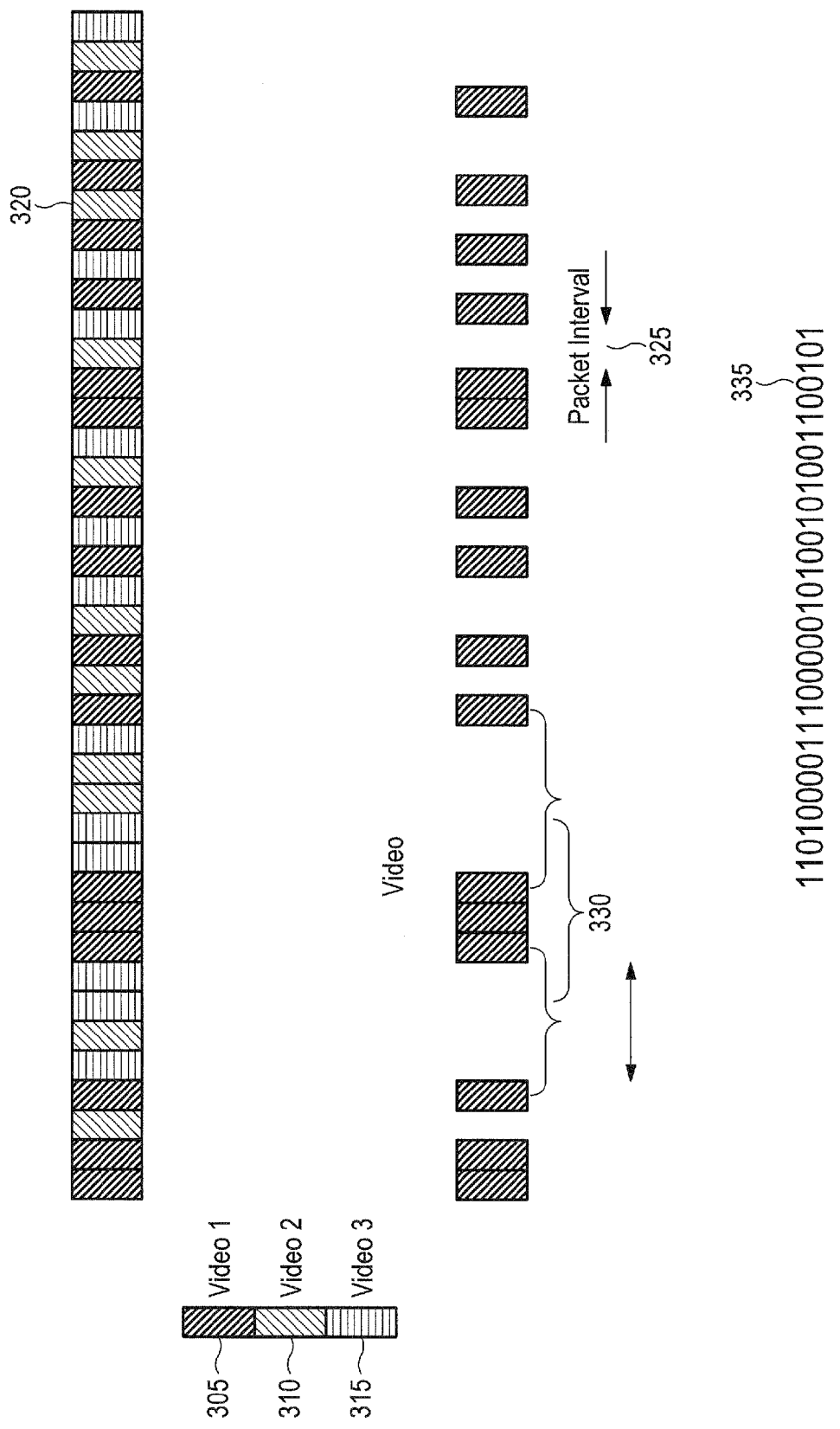
FIG. 3 is an illustration of a packet schedule timestamp according to one embodiment of the present invention.

FIG. 3 is an illustration of a packet schedule timestamp according to one embodiment of the present invention. Statistically multiplexed (statmuxed) transport stream 320 is shown comprising packets corresponding to video 1 transport stream 305, video 2 transport stream 310, and video 3 transport stream 315. Packets that correspond to the packet identifier (PID) of video 1 transport stream 305 are separately illustrated from statmuxed transport stream 320. In the illustrated embodiment, video 1 transport stream 305 has variable bit rate with a peak bit rate of R. For purposes of describing the present invention, the peak rate R of a VBR transport stream is the bit rate at which the transport packets are transmitted back-to-back. Although one skilled in the art will recognize that there are alternate ways of defining the transport rate, such as the ratio of the number of transport packets between two consecutive PCR values (not including null packets) and the time difference between these two PCR values.

In an exemplary embodiment, when video 1 305 is included in statmuxed transport stream 320, the bit rate of statmuxed transport stream 320 is also R. Packet interval 325 is the time D of one packet slot (i.e., timeslot) of statmuxed transport stream 320. That is, packet interval 325 is the time interval of one transport packet when it is transmitted at rate R. In an embodiment, relative timing 330 of the packets of a VBR bitstream, such as video 1 transport stream 305, can be described by a binary pattern. For example, if a data packet corresponding to video 1 transport stream 305 occupies a given packet slot in statmuxed transport stream 320, a binary "1" is assigned for the packet slot. Similarly, if a data packet corresponding to video 1 transport stream 305 does not occupy a given packet slot in statmuxed transport stream 320, a binary "0" is assigned for the packet slot. In an embodiment, a binary "0" is assigned for the packet slot when the packet slot does not contain a transport packet that corresponds to the packet identifier of the data stream of interest (i.e., the selected PID stream). Thus a binary "0" can represent a packet slot allocated to a data stream having another packet identifier, such as video 2 transport stream 310 in this example, a null packet, or other data packets. Although the bit positions represent individual packet slots of statmuxed transport stream 320, one skilled in the art will recognize that other representations of encoding relative packet timing in a packet timestamp can be selected.

In the example illustrated in FIG. 3, packet schedule timestamp 335 for video 1 transport stream 305 can be described by a 38 bit binary pattern (e.g., 0x3438294DA9). Packet schedule timestamp 335 describes the arrival timing or packet schedule of data packets in video 1 transport stream 305 for the illustrated segment of statmuxed transport stream 320. In an embodiment, allocating a bit position for each packet slot produces an efficient packet schedule timestamp. For example, 32 packet slots of statmuxed transport stream 320 can be represented by a single 32 bit word. In the described packet schedule framework, the inter-arrival times of transport packets are integer multiples of packet slots, and a packet slot has a time duration determined by the ratio between 1504 bits (i.e., a 188 byte transport packet) and the peak bit rate R. For example, if R=4 Mbps, then each packet slot duration is: 1504/4000000=376 us (microseconds). As described in further detail below, packet schedule timestamp 335 allows for reconstruction of the packet schedule to ensure timely delivery and presentation of the bitstream.

C. Schedule Information Packet (SIP)

Figure 4:
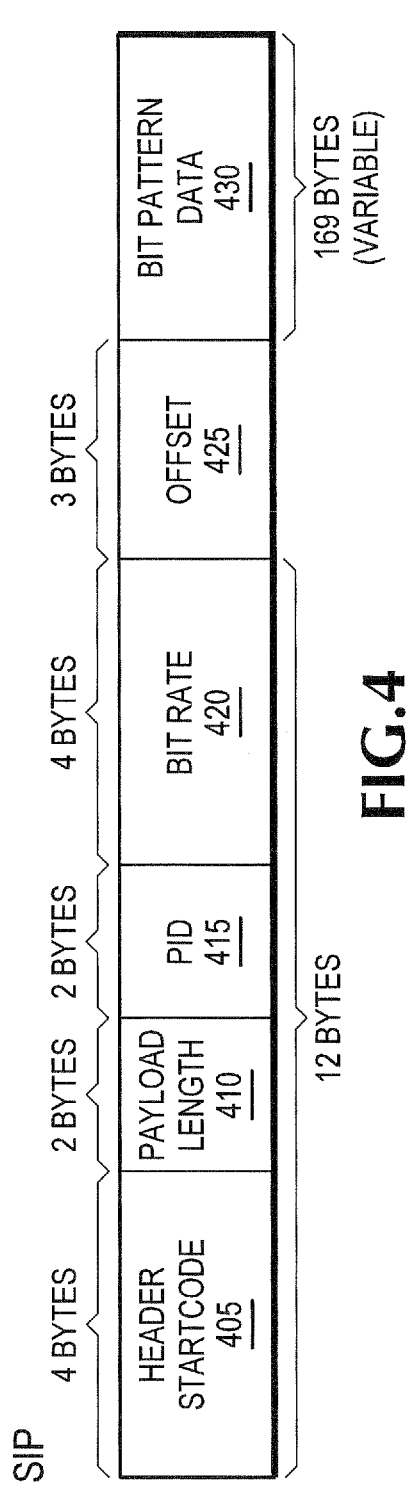
FIG. 4 is an illustration of a schedule information packet according to one embodiment of the present invention.

FIG. 4 is an illustration of a schedule information packet according to one embodiment of the present invention. For system entities, such as multiplexers, to make use of the packet schedule timestamp, packet schedule timestamps are formatted into a schedule information packet (SIP), which can be inserted into a transport packet for delivery. In an embodiment, to maintain compatibility with the MPEG-2 transport stream format, an SIP uses the same transport packet format. As described below and with reference to FIG. 5, the MPEG-2 transport packet includes a 4 byte header and 184 byte payload. If the entire 184 byte payload were allocated to a packet schedule timestamp, the SIP can be used to describe the packet schedule of up to 1,472 (184×8) transport packets.

In addition to packet schedules, however, an SIP also contains information about which program is described by the packet schedule timestamp (i.e., the packet identifier of interest). In the example data structure illustrated in FIG. 4, the data fields include header startcode 405, payload length 410, packet identifier 415, bit rate 420, offset 425, and bit pattern data 430. Header startcode 405 is used to indicate that this packet carries schedule information. The bit pattern for header startcode 405 should be selected as to not emulate the predefined startcode patterns of the compressed video standard being used. Header startcode 405 should also be selected so that it can be correctly interpreted by the intermediate systems along the path of the transport. Payload length 410 refers to the number of bytes in the SIP payload, excluding header startcode 405 and payload length 410 itself. Packet identifier 415 refers to which PID stream is described by the SIP. One skilled in the art will appreciate that packet identifier 415 can refer to a PID stream for video, audio, or data packets. Bit rate 420 refers to the peak bit rate of the multiplexed transport stream. The bit rate is used to determine the time duration of a single 188 byte transport packet (i.e., packet slot) to provide a context for the packet schedule timestamp. In this example where bit rate 420 is a 32 bit field, the maximum bit rate is $2^{32}=4,294,967,296$ bps, or about 4.3 Gbps. One skilled in the art will recognize that bit rate can be encoded in various forms to adjust the range or the granularity of this field. Offset 425 can be used to describe how many transport packets to skip ahead before bit pattern data 430 is used to describe the packets. In the illustrated example, 24 bits (i.e., 3 bytes) are allocated to offset 425. With a 24 bit field, the look-ahead capability is about 16,777,216 transport packets, or equivalent to up to 256 seconds of video at a 100 Mbps data rate. Further details of using look-ahead capability to describe transport packets are described below and with reference to FIG. 16.

Bit pattern data 430 is a variable length field for storing the packet schedule data. As described above and with reference to FIG. 3, a binary "0" means a packet slot is allocated to null packets or other packets, or a binary "1" indicates the presence of a packet. Bit pattern data 430 describes the presence or absence of transport packets in a given packet slot for a given or selected PID. With respect to one PID stream, a bit position of bit pattern data 430 can be a "1," but for a different PID stream, the same bit position is a "0." In an embodiment, the first bit of bit pattern data 430 is used to describe the first transport packet following the first transport packet carrying the SIP payload. Alternatively, as described below and with reference to FIG. 16, the SIP packet can include an offset 425 to describe transport packets further in the future to provide additional look-ahead capabilities to system entities. When generating a packet schedule timestamp, SIP packets themselves should also be taken into account, i.e., always assigned a "0" for each transport packet carrying an SIP.

Figure 5:
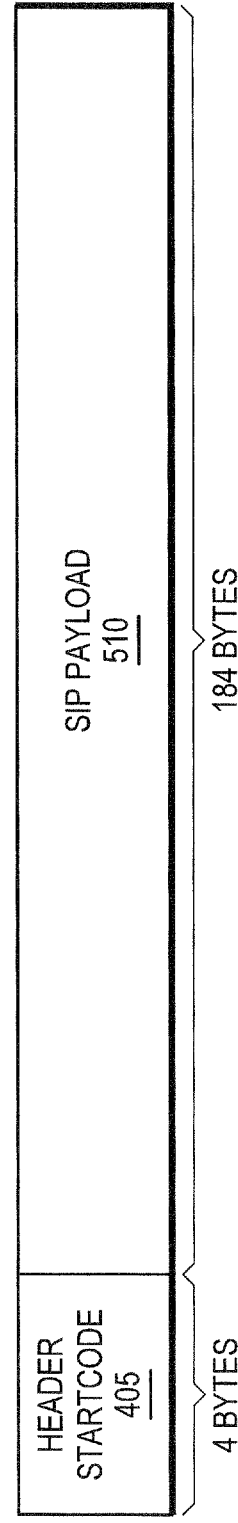
FIG. 5 is an illustration of a transport packet including a schedule information packet payload according to one embodiment of the present invention.

FIG. 5 is an illustration of a transport packet including a schedule information packet payload according to one embodiment of the present invention. The illustrated data fields include header startcode 405 and schedule information packet payload 510. A schedule information packet payload 510 can be included in a transport packet for delivery to a system entity, such as a statistical multiplexer. In an embodiment, the SIP is auxiliary data. System entities that handle the transport stream as it traverses a network can optionally make use of the SIP. For those system entities that recognize and use the information provided in the SIP, precise information about the transport packets of different PIDs is determined by the bit patterns contained within the SIP, regardless of whether the bitstream is PID filtered or remixed with other transport streams in CBR or VBR formats. A PID filtered bitstream refers to the process of separating one or more PID streams from a multiplexed transport stream based on PID values. For those systems that do not recognize the SIP, the packets are ignored or discarded. Therefore, the inclusion of an SIP does not cause compatibility problems with existing standards or protocols or otherwise interfere with system entity operation.

1. Identification

For a system entity to be aware of the schedule information packets, messages can be inserted to carry signaling information. Upon receiving these messages, the system entity can then identify the packet identifier (PID) of the transport packet carrying SIP payload 510. In one embodiment, these messages can be inserted into an MPEG program service information (PSI) payload as private data fields. PSI refers to transport packets with a special information payload on specially assigned PIDs. The special information payload can be used to indicate the PID assignments of audio, video data streams, and other information types. The receiver decoder can use PSI to determine the organization of the PID streams and determine which bitstreams are related to form a shared timebase program. System entities that understand these messages can also choose to identify the PID of the schedule information packets and extract their payload.

2. Insertion Intervals

The range of payload length 410 controls how many transport packets can be scheduled in one SIP. For example, with a 16 bit field the schedule of up to $(2^{16}-6) \times 8=524,240$ transport packets can be described in one SIP. In an embodiment, SIP payload 510 can have fixed or variable size, which is determined by payload length 410. In addition, each SIP can be the payload of one single transport packet, or span multiple transport packets. In one implementation, one transport packet can be used to hold an entire SIP. In this case, the entire 184 bytes of payload of a transport packet can be used to carry the SIP. Since 12 bytes are used to store header startcode 405, payload length 410, and other fields, 169 bytes are used to store bit pattern data 430, which corresponds to 1352 transport packets. According to one embodiment, one transport packet carrying an SIP can be used to describe the packet schedule for the next 1352 packets. Alternatively, as described below and with reference to FIG. 16, the SIP packet can contain offset 425 and can be configured to describe transport packets that are not necessarily adjacent to the SIP transport packet.

In one embodiment described above, the SIP packet schedule is created with respect to a multiplexed transport stream, with the presence of the selected PID stream packet in a given packet slot of the multiplexed transport stream indicated as "1" and the rest as "0." Further, a multiplexed transport stream contains multiple PID streams. According to one embodiment, each PID stream may have an associated SIP data stream to describe accurately the packet schedule of the PID stream. For example, in the case of one transport packet per SIP, 1376 packets can be described by the SIP (without offset 420). For a multiplexed transport stream with bit rate of, for example, 38.4 Mbps (commonly used for cable distribution), 1376 transport packets have a duration of about $$\frac{1504 \times 1376}{38400000} \approx 53.9 \text{ ms.}$$

Figure 6:
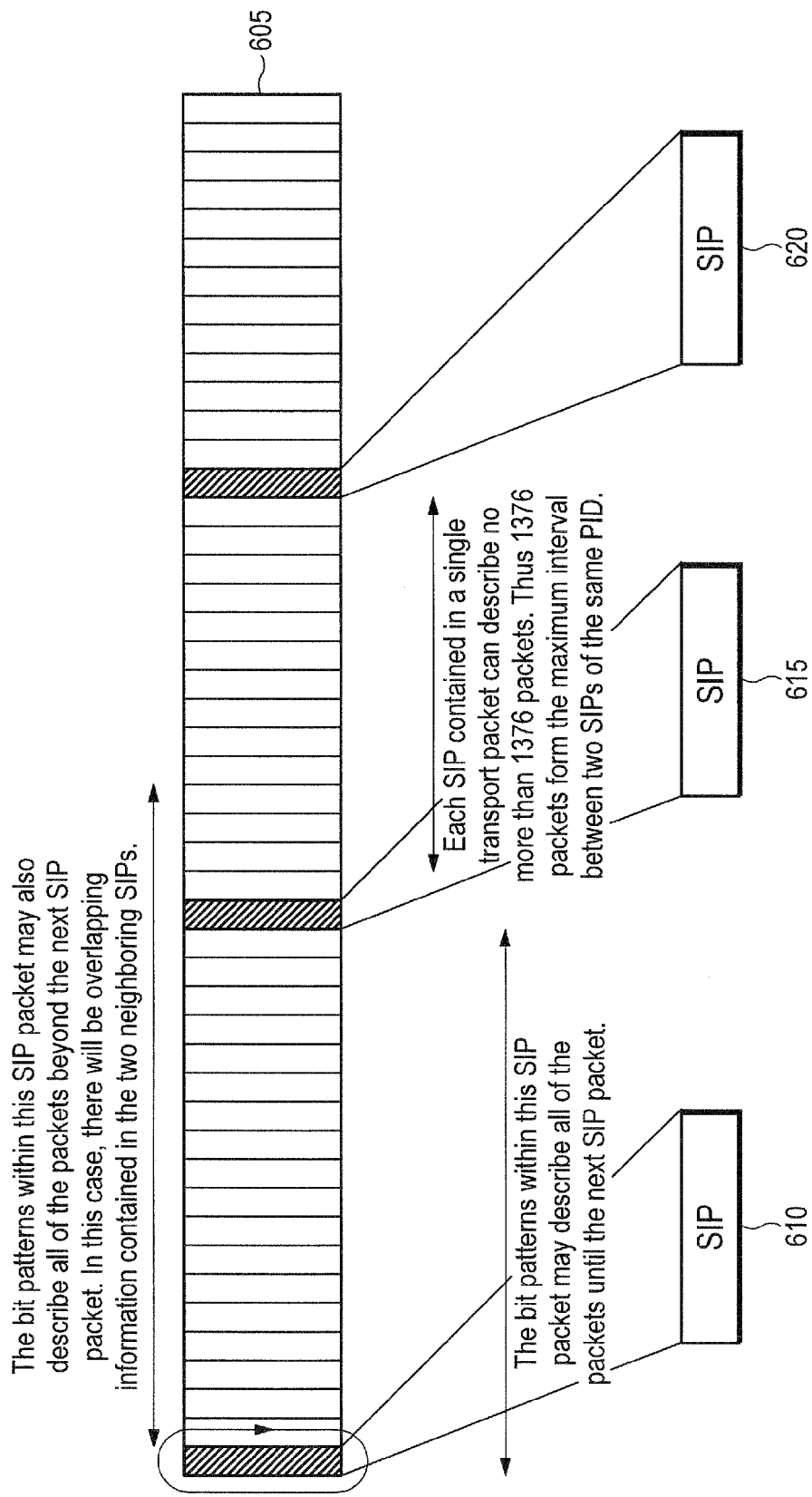
FIG. 6 is an illustration of a schedule information packet placement intervals according to embodiments of the present invention.

FIG. 6 is an illustration of schedule information packet placement intervals according to embodiments of the present invention. Transport stream 605 is shown with SIP 610, SIP 615, and SIP 620 inserted to describe intervening transport packets. SIP 610 and SIP 615 are inserted closer than the minimum interval (e.g. 53.9 ms for 38.4 Mbps bit rate). In one embodiment, SIP 610 describes transport packets until the next SIP, which is SIP 615. In another embodiment, SIP 610 describes transport packets beyond the next SIP, thereby creating an overlap of packet schedule information. Therefore, to characterize the bit rate profile fully and provide the packet schedule information on a continuous basis, in this example, at least one SIP packet must be inserted no more than 53.9 ms apart for each of the PID streams. In a QAM-256 multiplex at a bit rate of 38.4 Mbps, there are typically about 15 video programs. Assuming that each video program has only one video PID stream, and one audio PID stream, there will be at least 30 SIP packets per 53.9 ms, resulting in a bit rate dedicated to the schedule information packets to be about $$\frac{1}{53.9 \times 10^{-3}} \times 30 \times 1504 = 0.837 \text{ Mbps.}$$

When compared with the overall 38.4 Mbps bit rate, 0.837 Mbps is not a significant amount of bandwidth.

Alternatively, each SIP can span multiple transport packets. In this embodiment, more than 1376 transport packets can be described by the SIP. The maximum number of transport packets that can be described by the bit pattern data within a single SIP is 542,240, based on the above description of payload length 410 (i.e., a 16 bit field). Because each transport packet is defined by a single bit in the SIP bit pattern data, these 542 Kbits can be represented by approximately 357 transport packets. That is, if all of these 357 SIPs are inserted consecutively, then there is no need to insert more SIPs for this PID stream for another 524,240 transport packets. At a multiplex bit rate of 38.4 Mbps, this translates to about $$\frac{1504 \times 524240}{38400000} \approx 20.5 \text{ sec.}$$

The bit rate profile of a PID stream can be fully characterized, therefore, when a group of 357 SIPs are inserted no more than 20.5 seconds apart if the total bit rate is no more than 38.4 Mbps.

D. SIP Generation and Processing Delay
Multiplexed Transport Stream

For a statistically multiplexed transport stream with multiple VBR data streams, schedule information packets preserve the timing information for each of the VBR PID streams. In an embodiment, the look-ahead nature of the SIP is useful for system entities where look-ahead packet level processing can be used to generate SIPs that characterize the packet schedule or bit rate profile of a PID stream. The bit rate profile can then be used later by other system entities for look-ahead scheduling of the transport packets without introducing long buffer latency to look-ahead.

Figure 7:
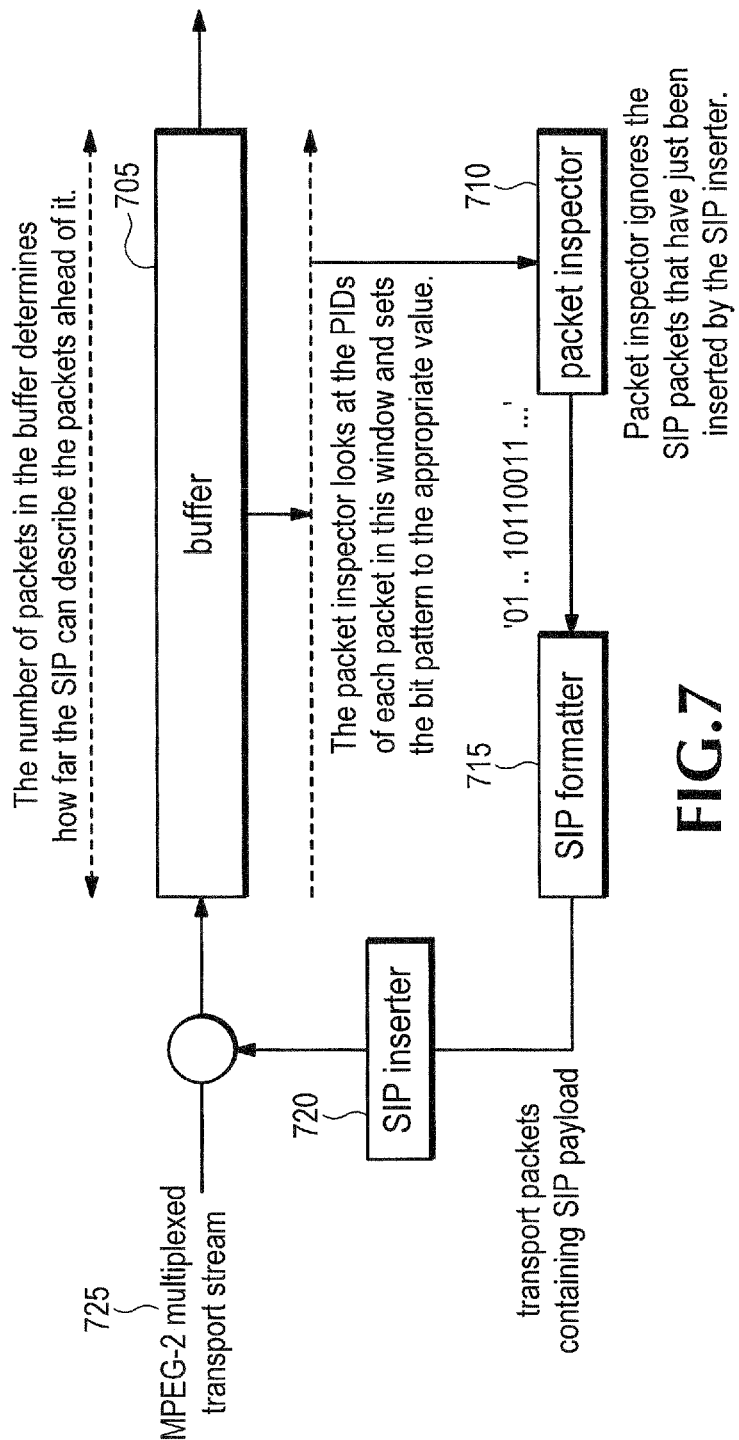
FIG. 7 is a block diagram of a schedule information packet generator according to one embodiment of the present invention.

FIG. 7 is a block diagram of a schedule information packet generator according to one embodiment of the present invention. The block diagram shows each of buffer 705, packet inspector module 710, formatter module 715, and inserter module 720 coupled. Buffer 705 forms a first-in-first-out (FIFO) queue for packets from multiplexed transport stream 725. Multiplexed transport stream 725 inputs packets of all PIDs to buffer 705. The size of buffer 705 (i.e., buffer depth) determines the number of transport packets that will be buffered. For example, buffer 705 can be configured to store 1376 transport packets. In an embodiment, payload length 410 of the schedule information packet corresponds to the size of buffer 705. Packet inspector module 710 examines the PIDs of each packet in buffer 705 to determine the bit pattern description for a selected PID. For example, packet inspector module 710 examines the packet header in each packet slot to determine if it contains a PID that corresponds to the selected PID. If a packet slot contains a packet that matches the selected PID, the corresponding bit is set to "1," otherwise, it is set to "0." Formatter module 715 receives the bit pattern description from packet inspector module 710. Formatter module 715 generates other SIP data field and formats the bit pattern and other data fields into an SIP payload. An example of the data structure is provided above and with reference to FIG. 4. In an embodiment, the output of formatter module 715 is an MPEG-2 compliant transport packet. One skilled in the art will recognize that MPEG-2 format represents one type of compressed video and other data formats can be implemented. Formatter module 715 passes the transport packet to inserter module 720. Inserter module 720 inserts one or more SIPs into multiplexed transport stream 725. In an embodiment, the SIPs are inserted into the multiplexed transport stream 725 before the corresponding transport packets. After SIPs are inserted, the contents of buffer 705 are sent out for transmission or storage. When buffer 705 is flushed, it is filled with new packets for the next round of SIP generation.

Figure 8:
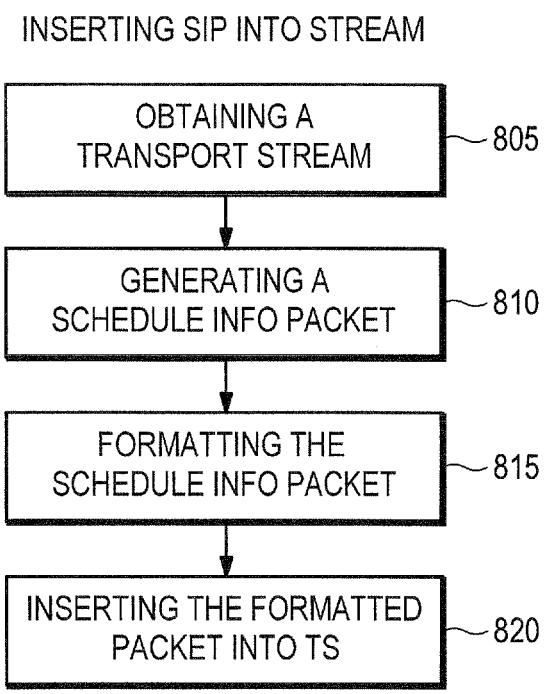
FIG. 8 is a flowchart for inserting a schedule information packet into a transport stream according to one embodiment of the present invention.

FIG. 8 is a flowchart for inserting a schedule information packet into a transport stream according to one embodiment of the present invention. In an embodiment, a general-purpose computing device can be configured to implement the step of the illustrated method. One skilled in the art will recognize, however, that a special-purpose computing device or hardware can implement the described functionalities. Further, program instructions to control the computing device can be distributed on a computer readable medium or storage volume. The computer readable storage volume can be available via a public network, a private network, or the Internet. Program instructions can be in any appropriate form, such as source code, object code, or scripting code.

A method for inserting a schedule information packet begins with obtaining a transport stream 805. The transport stream is analyzed to generate a packet scheduling timestamp 810 for a particular PID stream or set of PID streams. One skilled in the art will appreciate that multiple PID streams can be analyzed concurrently to generate packet schedule information for a number of distinct PID streams in the transport stream. The packet scheduling timestamp is then formatted into a schedule information packet 815. The schedule information packet is then inserted into the transport stream 820.

Figure 9:
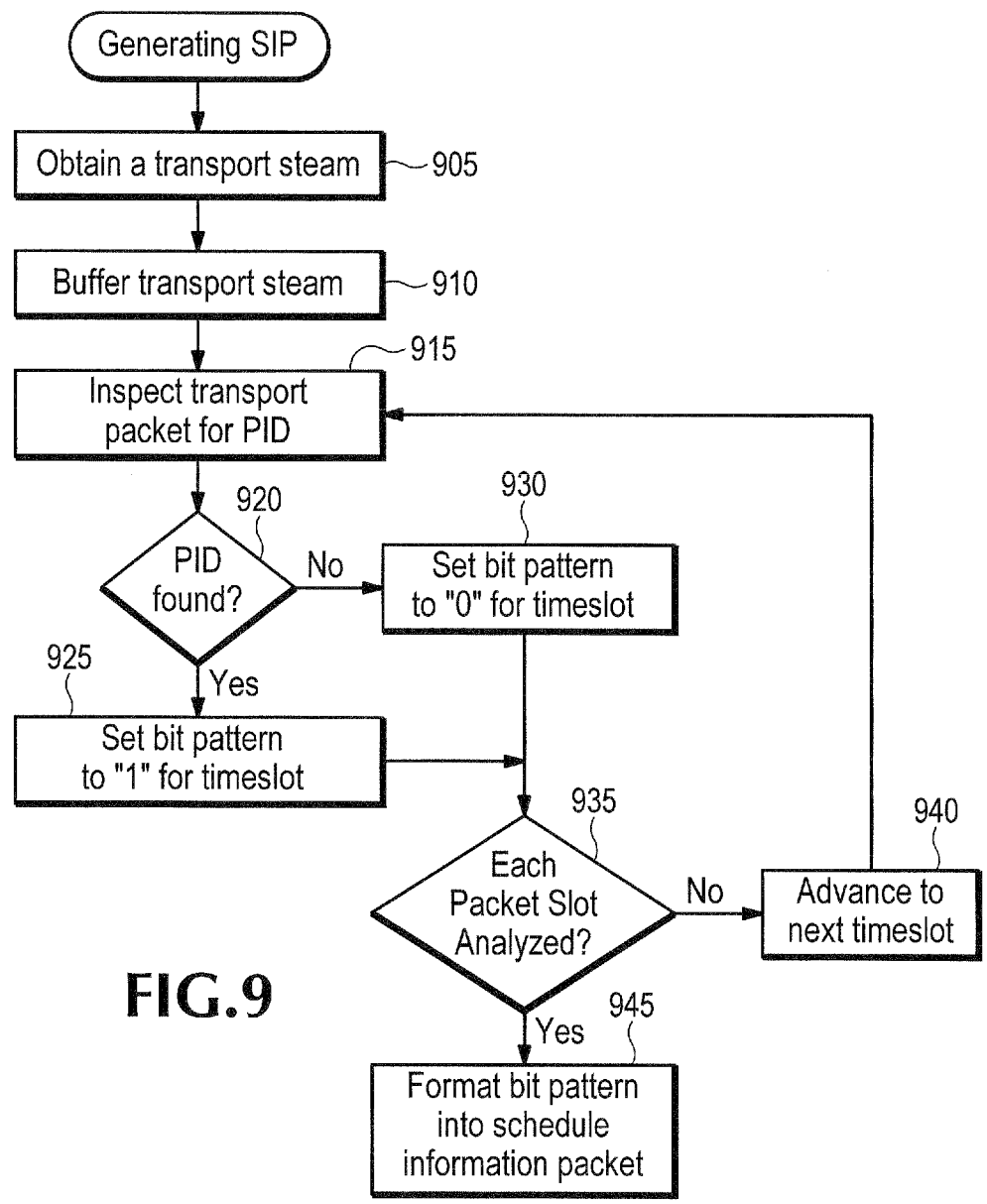
FIG. 9 is a flowchart for generating a schedule information packet according to one embodiment of the present invention.

FIG. 9 is a flowchart for generating a schedule information packet according to one embodiment of the present invention. In one embodiment of the present invention, the steps of the illustrated flowchart correspond to the functions performed by the schedule information packet generator described above and with reference to FIG. 7. A method for generating a schedule information packet begins with obtaining a transport stream 905. Transport packets from the transport stream are then buffered 910 to enable look-ahead processing. In one embodiment, the look-ahead processing occurs in real-time. That is, the transport stream is processed during delivery or transport of a bitstream. One skilled in the art will recognize, however, that the processing can occur off-line. For example, the transport stream can be retrieved from data storage, processed, and then returned to data storage with SIPs included in the data stream. After buffering, the transport packets are inspected for a selected PID 915. If the selected PID is found 920 in a given packet slot or timeslot, a bit pattern description is set to a value of logic "1" for the packet slot 925. If the selected PID is not found in a given packet slot, then the bit pattern description is set to a value of logic "0" for the packet slot 930. Next, it is determined whether each packet slot has been analyzed for the selected PID 935. If each packet slot has not been analyzed, control advances to the next packet slot 940 and the process repeats at step 915. Processing each of the packet slots in this manner generates a bit pattern description that describes the state of each of the packet slots in the buffer. Next, the bit pattern description is combined with other data fields and formatted into a schedule information packet 945. One skilled in the art will appreciate that other iterative or recursive methods can be implemented to generate the bit pattern description or schedule information packet. For example, a single bit pattern description or multiple bit pattern descriptions could be generated in parallel.

Figure 10:
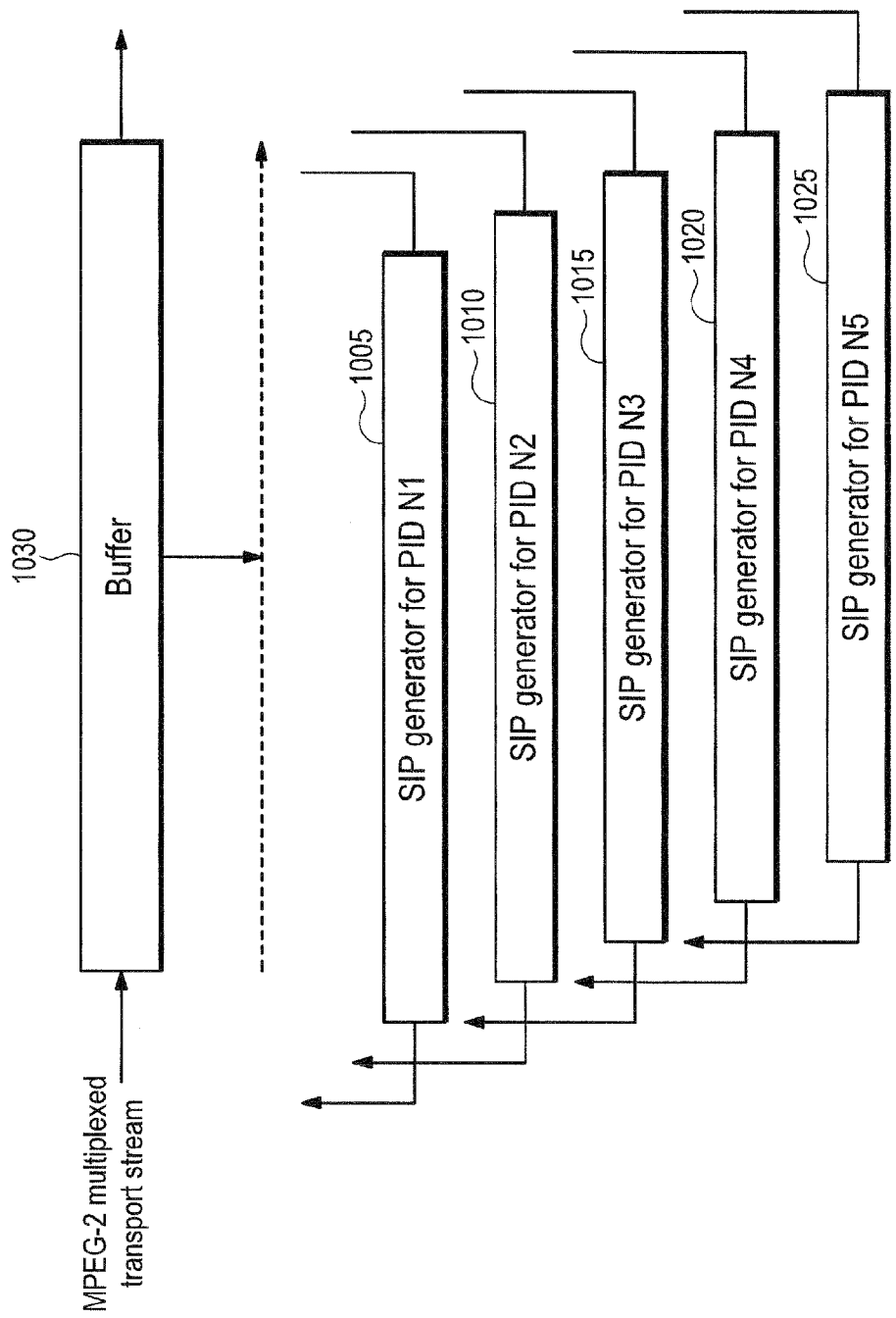
FIG. 10 is a block diagram of using multiple schedule information packet generators according to one embodiment of the present invention.

FIG. 10 is a block diagram of using multiple schedule information packet generators according to one embodiment of the present invention. The block diagram illustrates multiple SIP generators 1005, 1010, 1015, 1020, and 1025 operationally coupled with buffer 1030. Each of the SIP generators, for example, SIP generator 1005, is an instance of the SIP generator described above and with reference to FIG. 7. One skilled in the art will appreciate, however, that some functionality can be shared among the multiple SIP generators. For example, a single inserter module 720 could be configured to insert SIPs that describe several different data streams. Each one of the multiple SIP generators is configured to generate SIPs for a selected data stream. For instance, SIP generator 1005 analyzes buffer 1030 for a first packet identifier, while SIP generator 1010 concurrently analyzes buffer 1030 for a second packet identifier. An advantage of using multiple SIP generators is concurrent characterization of bit rate profiles for each of several data streams present in a multiplexed transport stream. In another embodiment, each of the multiple SIP generators can be configured to analyze a portion of buffer 1030 for insertion of SIPs into different places in the transport stream. In a case where it is desirable to have SIPs that characterize overlapping portions of a data stream, multiple SIP generators could be configured to each analyze buffer 1030 for the same PID stream.

In embodiments of the present invention, a single SIP stream describes a single PID stream. In another embodiment, however, a single SIP payload can be configured to describe bit patterns for a set of PIDs. In this case, additional header fields can be added to the SIP to enable a system entity or parser to determine which bit pattern is for which PID. In this implementation, it is possible to have a single SIP stream that describes each of the PID streams within the multiplexed transport stream. In an example implementation, bit pattern data 430 can be replaced by a bit field that describes the presence/absence of a PID labeled by a predetermined number of bits. In a case where 16 video and audio PID streams are to be described, then 4 bits are needed to encode the bit patterns for each of the 16 streams. For example, a "0000 1000 1110 1101" string describes four packets of PID "null 8 14 13". One skilled in the art will recognize that assuming there are not too many PIDs to be described, the MPEG-2 standard 13 bit PID field can be remapped to a smaller field (e.g., 4 bits). In many cases, when only video and audio packets need to be described there may be around 100 PIDs. That is, each entry for a PID in the bit field will comprise up to 8 bits.

2. Processing Delay

In embodiments of the present invention, SIP generation possibly buffers a large number of transport packets. The delay introduced by buffering is proportional to the buffer size and bit rate. For real-time transmission and processing of data streams, a delay of up to a few seconds can be introduced into the transport of delivery system. This means that the viewer will receive the signal after some delay. For broadcasting of digital video programs, a delay of a few seconds is generally acceptable because it is not noticeable to most viewers that the program is behind real-time by a few seconds. For interactive or on demand delivery of video programs, however, even a short delay can present a problem because the user's command input (e.g., fast forward/backward, channel change, etc.) is delayed before the commands affect the bitstream output. Typical users do not tolerate round-trip delay of more than one second.

However, most on-demand video programs, such as movies, recorded television programs, e-learning content and other information programs, can be stored on video servers. General-purpose computing devices can process this content off-line, so that SIPs can be generated and inserted into the bitstream before being stored back to the video server. When off-line processing is implemented, the delay introduced by buffering transport packets to look-ahead and generate SIPs becomes irrelevant for pre-stored compressed video programs.

3. Converted Transport Streams

As described above and with reference to FIG. 2, there are multiple system level formats for MPEG-2 data. In an embodiment, it can be desirable to convert content in a program stream format to a transport stream format to enable real-time delivery of the content across a data network. For example, digital versatile disc (DVD) video data is based on the MPEG-2 program stream format. During this conversion, transport packets are generated from the payload of the program stream packets.

Figure 11:
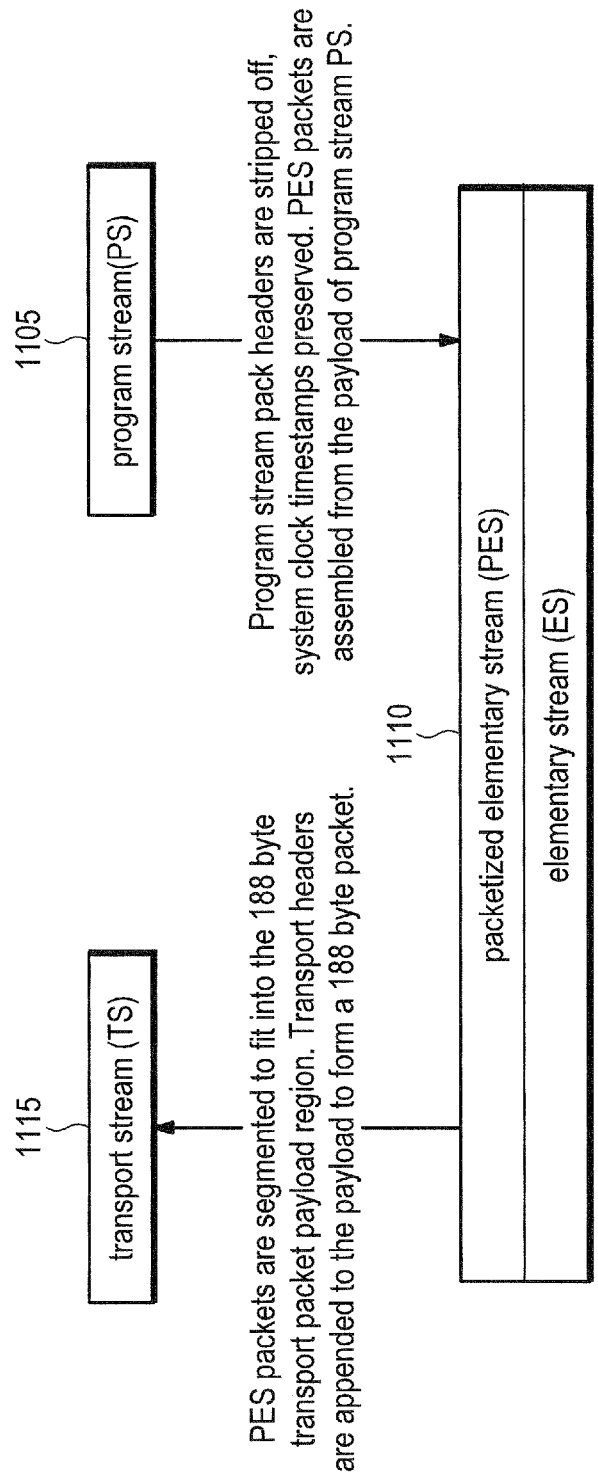
FIG. 11 is a block diagram of a program stream to transport stream converter according to one embodiment of the present invention.

FIG. 11 is a block diagram of a program stream to transport stream converter according to one embodiment of the present invention. In the illustration, program stream 1105 is reassembled into packetized elementary stream 1110. Packetized elementary stream 1110 is then segmented and formatted to produce converted transport stream 1115. In the case of a DVD source program stream converted transport stream 1115 is a VBR bitstream. To avoid causing buffer exceptions at a receiver decoder, the packet arrival times or relative timing of program stream 1105 needs to be preserved in converted transport stream 1115. In an embodiment, SIPs are used to provide a complete timing description for each of the packets without introducing transport stream incompatibilities or inefficient null packets.

Figure 12:
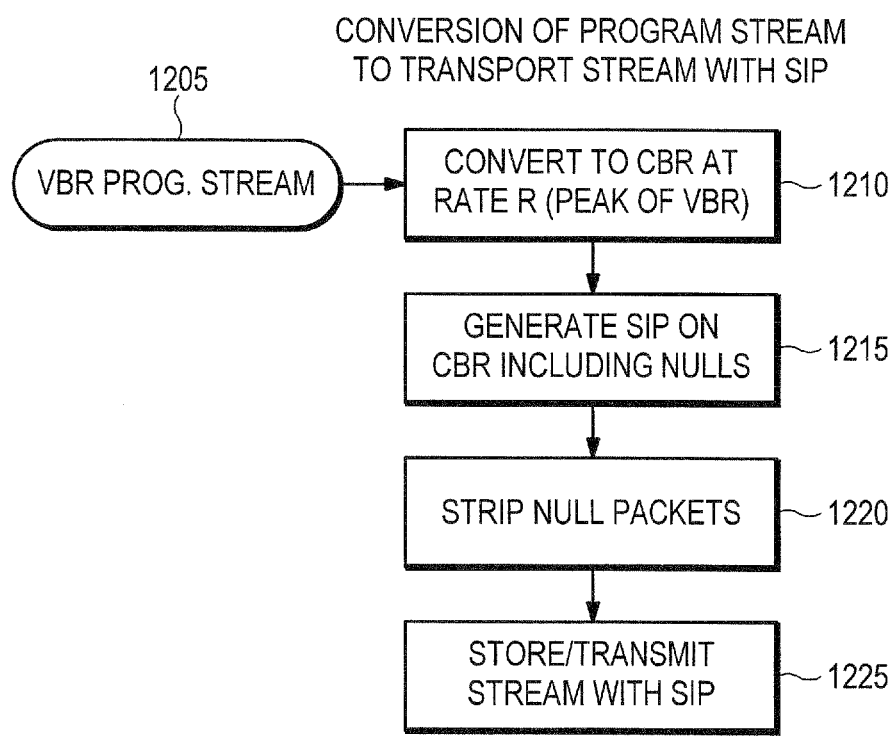
FIG. 12 is a flowchart for converting a program stream to a transport stream according to one embodiment of the present invention.

FIG. 12 is a flowchart for converting a program stream to a transport stream according to one embodiment of the present invention. In the exemplary method illustrated, VBR program stream 1205 is input to a program stream converter, such as is described above and with reference to FIG. 11. Program stream 1205 is converted to a CBR transport stream at bit rate R 1210, which is the peak bit rate of program stream 1205. In an embodiment, null packets are added to preserve the packet arrival timing during conversion. An SIP generator is then used to generate SIPs for the packets of the CBR transport stream 1215. After the timing of the packets has been characterized, the null packets are removed 1220 to produce a converted transport stream that includes packet schedule timestamps. The converted transport stream including SIPs can be stored on a video server or transported to other system entities 1225. In another embodiment of the present invention, null packets are not added, but the positions are computed or recorded. The SIP generator then uses the information about where null packets are needed to generate the appropriate SIPs. In this case, a converted transport stream can be produced without even temporarily introducing null packets in the data stream.

4. Data Storage Efficiency Gain

A typical multiplexed transport stream contains approximately 5% to 20% null packets. One use of null packets is to ensure that the transport stream has a given bit rate. Null packets also occupy packet slots in the transport stream to ensure the relative timing of the video data packets. In an embodiment of the present invention, schedule information packets can describe the packet scheduling information of a multiplexed MPEG-2 transport stream, and accordingly eliminate the need for null packets in the multiplex. Embodiments of the present invention advantageously use SIPs to carry the timing information, while introducing a comparatively small amount of overhead. Features of the invention can therefore create data storage savings of 20% or more, which permits more video data to be archived on a given video server platform. For a VBR encoded transport stream, the difference between the peak rate and the average rate is more significant, thus the gain in efficiency is even more with the use of SIPs.

E. Timing Recovery and Traffic Engineering

Additional applications of the schedule information packet (SIP) include timing recovery and look-ahead traffic engineering. These applications are now described in more detail. As described above, the SIP allows for removal of uninteresting transport packets, such as null packets, from a multiplexed transport stream without losing the packet scheduling information. The removed packets can be labeled as "0" bits in the SIP payload. Because of the removed packets, the remaining packets, which are labeled as "1" bits in the SIP payload, will be closer in time than they actually are if those packets are not removed. As described above, proper arrival times need to be preserved to avoid buffer exceptions at a system entity, such as a receiver decoder. The temporal position of removed packets (pattern "0" packets) can be restored in relation to selected packets (pattern "1" packets) to produce, for example, a decoder compliant bitstream.

Figure 13:
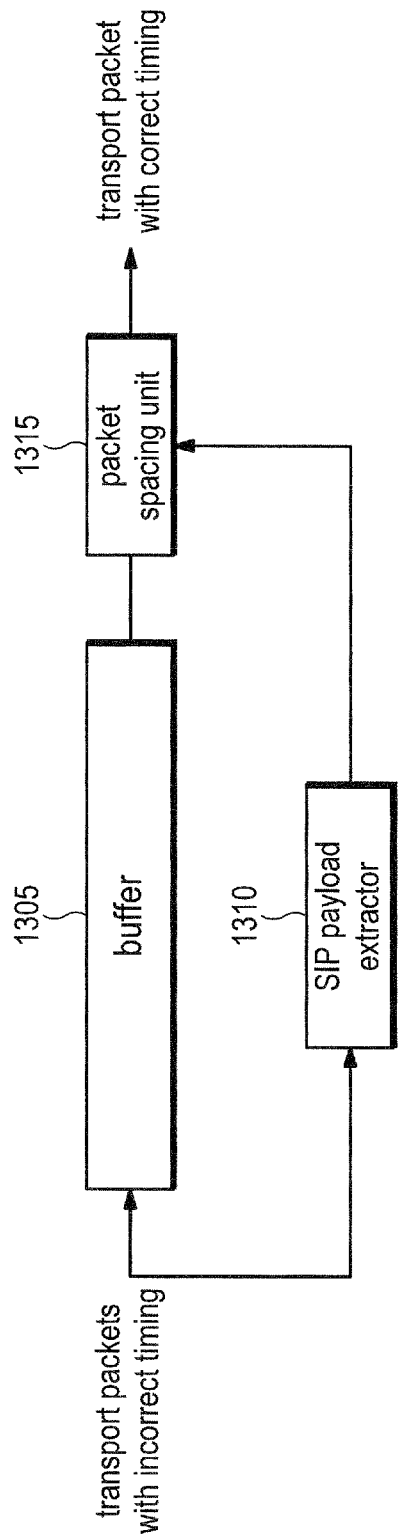
FIG. 13 is a block diagram of a timing recovery module according to one embodiment of the present invention.

FIG. 13 is a block diagram of a timing recovery module according to one embodiment of the present invention. The illustrated apparatus includes a buffer 1305, SIP payload extractor 1310, and packet spacer 1315. In operation, transport packets with incorrect timing are input to buffer 1305 and SIPs are directed to SIP payload extractor 1310. In an embodiment, the transport packets with incorrect timing are transmitted back-to-back into buffer 1305. SIP payload extractor 1310 receives an SIP and parses it for a packet schedule timestamp. SIP payload extractor 1310 uses the extracted packet schedule information to instruct packet spacer 1315 how to adjust the relative timing of transport packets in buffer 1305. In an embodiment, packet spacer 1315 transmits packets out of the buffer at the peak bit rate R and inserts null packets or other data packets into the bitstream to produce an output data stream having an appropriate packet schedule. As a result of this operation, the packets of the selected PID stream have their packet schedule restored to the point where the SIP was originally constructed.

Figure 17:
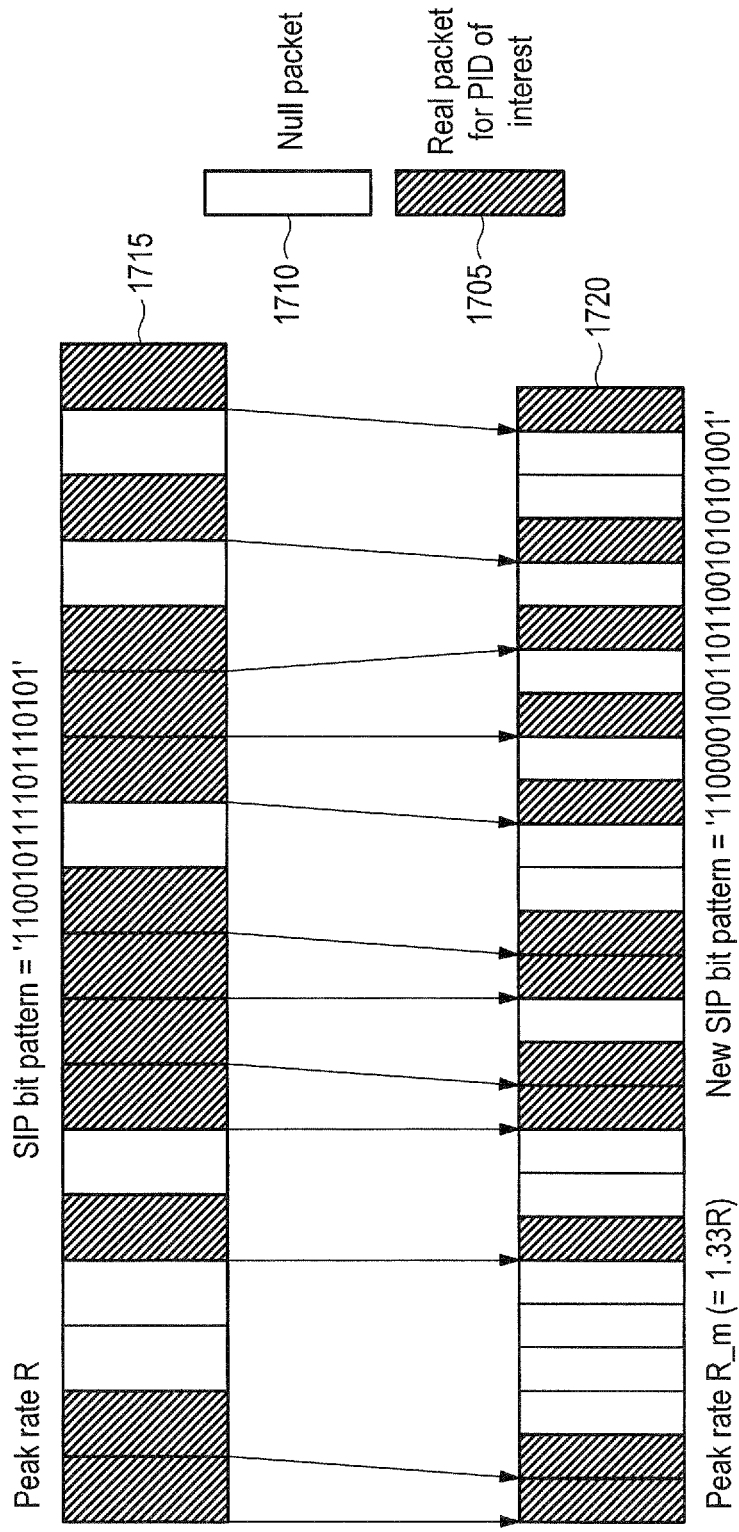
FIG. 17 is an illustration of packet stretching according to one embodiment of the present invention.

One skilled in the art will appreciate that to preserve the relative packet timing, it may not be necessary for the rest of the packets to have the same packet schedule. FIG. 17 is an illustration of packet stretching according to one embodiment of the present invention. A PID stream with an SIP specifying its peak bit rate to be R, does not have to be paced out at bit rate R. For example, if PID_0 stream has a peak rate R0 and PID_1 has a peak bit rate R1 and the paced out bit rate is R_m (should be >=R0 and R1 to restore the packet schedule), then the packet schedule for PID_0 at the new bit rate R0 can be recalculated by "stretching" the bit patterns by a ratio of R0/R. That is, if R0=15 Mbps, R=10 Mbps, then each bit in the bit pattern becomes 1.5 bit. Because fractional bits are not possible, packet spacing unit 1315 uses rounding to reconstruct the packet schedule approximately.

As a result of packet stretching, for example, a 10 packet sequence, when described by the original SIP takes 10 bites, but the new SIP becomes 15 bits at the new R0 bit rate, with some of the bits repeated. Another similar example when R0/R=4/3 (1.33333) is illustrated in FIG. 17. In FIG. 17, real packets 1705 and null packets 1710 are shown for a single PID of interest. Null packets 1710 can also include the packets for uninteresting transport streams (as described above) or other PIDs streams. The timing of a real packet of interest 1705 is perturbed by a fraction of a single packet transmit time. An original packet schedule at peak rate R 1715 is shown to be "1100101111101110101." The original packet schedule at peak rate R 1715 is "stretched" or recalculated for peak rate R_m to generate new packet schedule 1720 of "110000100110110010101001." That is, packet spacing unit 1315 recalculates the presentation of packets to preserve the relative packet timing when presented at different bit rate (which has correspondingly different packet slots of timeslots).

One skilled in the art will recognize that if multiple such packet pacing operations, one for each PID stream, are applied concurrently the PID streams and remultiplexed into a single stream, there may be conflict with the resulting schedule. For example, PID_0 may need to occupy the same packet slot as PID_1. In this case, one of them may need to be transmitted one slot later or earlier to avoid the conflict. In another example, PID_0 and PID_1 are to be multiplexed and restored to their original packet schedule using their respective SIP information. For a particular duration of time, however, packet spacing unit 1315 cannot generally deliver both PID streams at a peak bit rate of R. Therefore, the SIP information should be supplemented with additional buffering or other processing to restore the original packet schedule.

Figure 14:
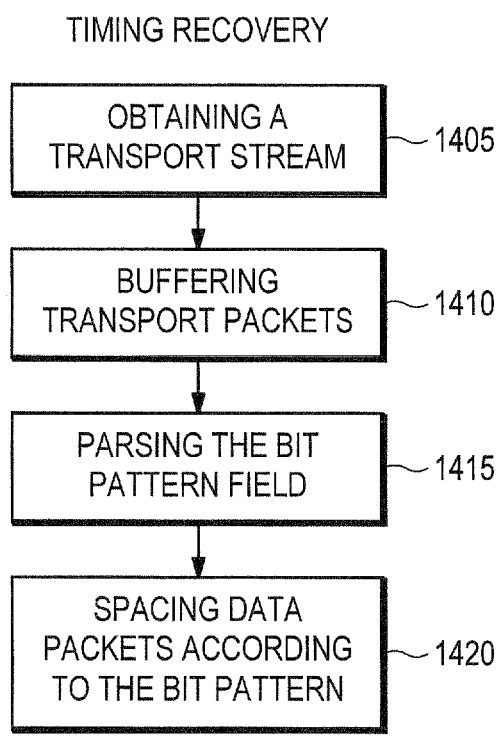
FIG. 14 is a flowchart for timing recovery according to one embodiment of the present invention.

FIG. 14 is a flowchart for timing recovery according to one embodiment of the present invention. In an embodiment, the steps of the illustrated flowchart correspond to the functions performed by the timing recovery module described above and with reference to FIG. 13. The method begins with obtaining a transport stream 1405. Packets of the transport stream are buffered 1410 so that timing information can be reconstructed. SIPs are then parsed to extract the bit pattern fields 1415. Transport stream packets are then spaced according to the bit pattern and output for delivery or other use.

Figure 18:
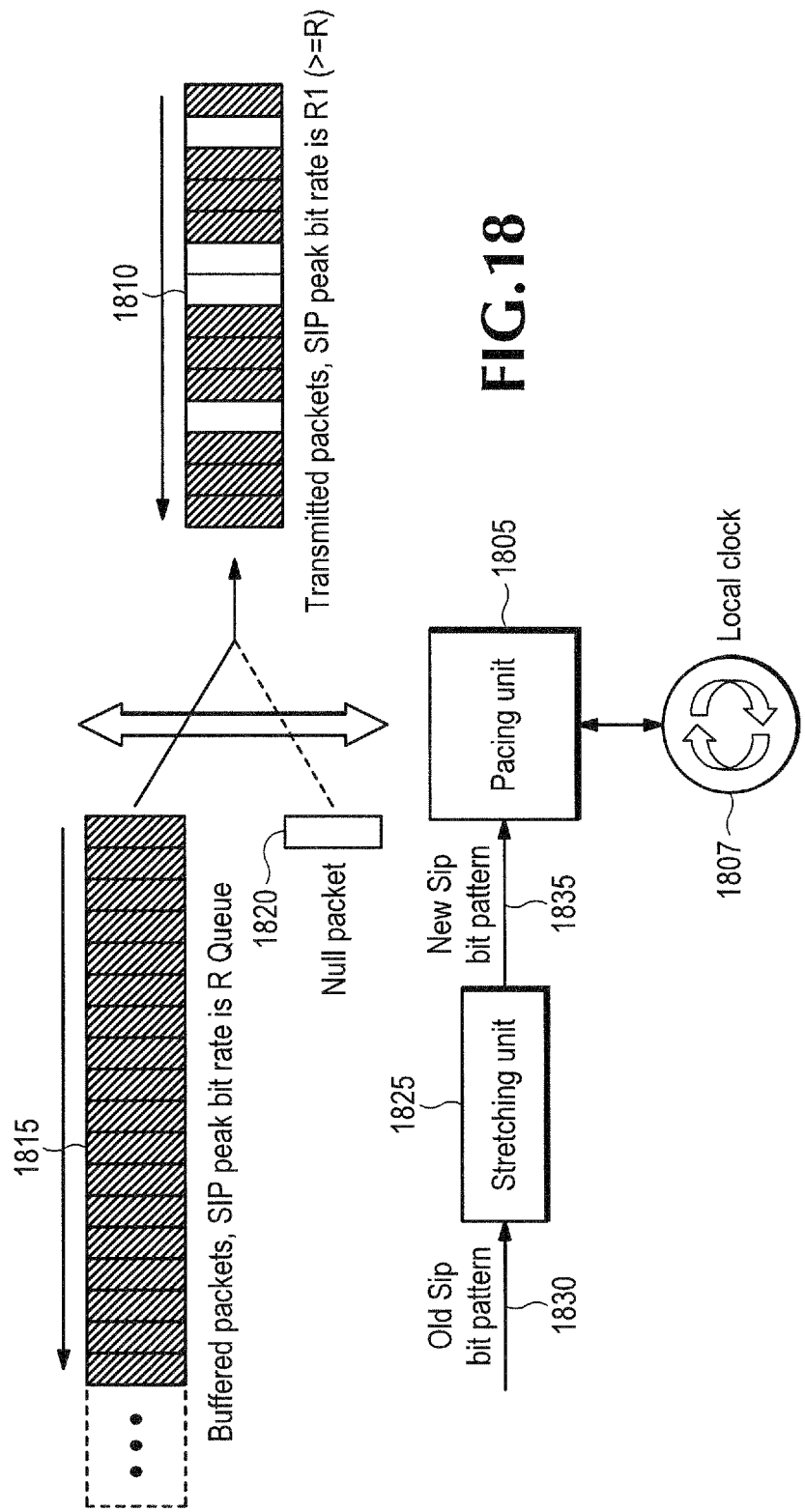
FIG. 18 is a further block diagram of a timing recovery module according to one embodiment of the present invention.

FIG. 18 is a further block diagram of a timing recovery module according to one embodiment of the present invention. As described above and with reference to FIG. 17, peak bit rates can be changed and packet schedules adjusted accordingly to restore original packet timing and deliver packets with the appropriate relative arrival times (e.g., approximately or absolutely the same as the original packet schedule). With reference to FIG. 18, a pacing unit 1805 runs a local clock 1807 and delivers transmitted packets 1810 using the new peak bit rate R1. In the illustrated embodiment, the pacing unit 1805 releases one packet every time slot. Here, a time slot is the duration of time required to transmit one 188 byte packet at the peak bit rate R1. Using the SIP bit pattern, which is obtained based on peak bit rate R, the pacing unit 1805 determines whether to release a packet from a buffer queue 1815 or release a null packet 1820 to the output. Because null packet 1820 is used as a stuffing packet it does not have to be buffered. A stretching unit 1825 recalculates the SIP bit pattern by a ratio of R1/R (>=1) as described in further detail above. For example, if this ratio is r (>=1) for a section of an old SIP bit pattern 1830 of M bits, then the new SIP bit pattern 1835 contains r*M bits. The $i^{th}$ bit from the old SIP bit pattern 1830 is mapped to the int(i*r)$^{th}$ bit in the new SIP bit pattern 1825, where the "int" operation is defined as a mathematical rounding down (or up) to the nearest integer. One skilled in the art will note that because the ratio r is >=1, two different values of I will not be rounded to the same value. The new SIP bit pattern 1835 is input to the pacing unit 1805, which uses the new SIP bit pattern 1835 to determine the output packet schedule for transmitted packets 1810.

Figure 15:
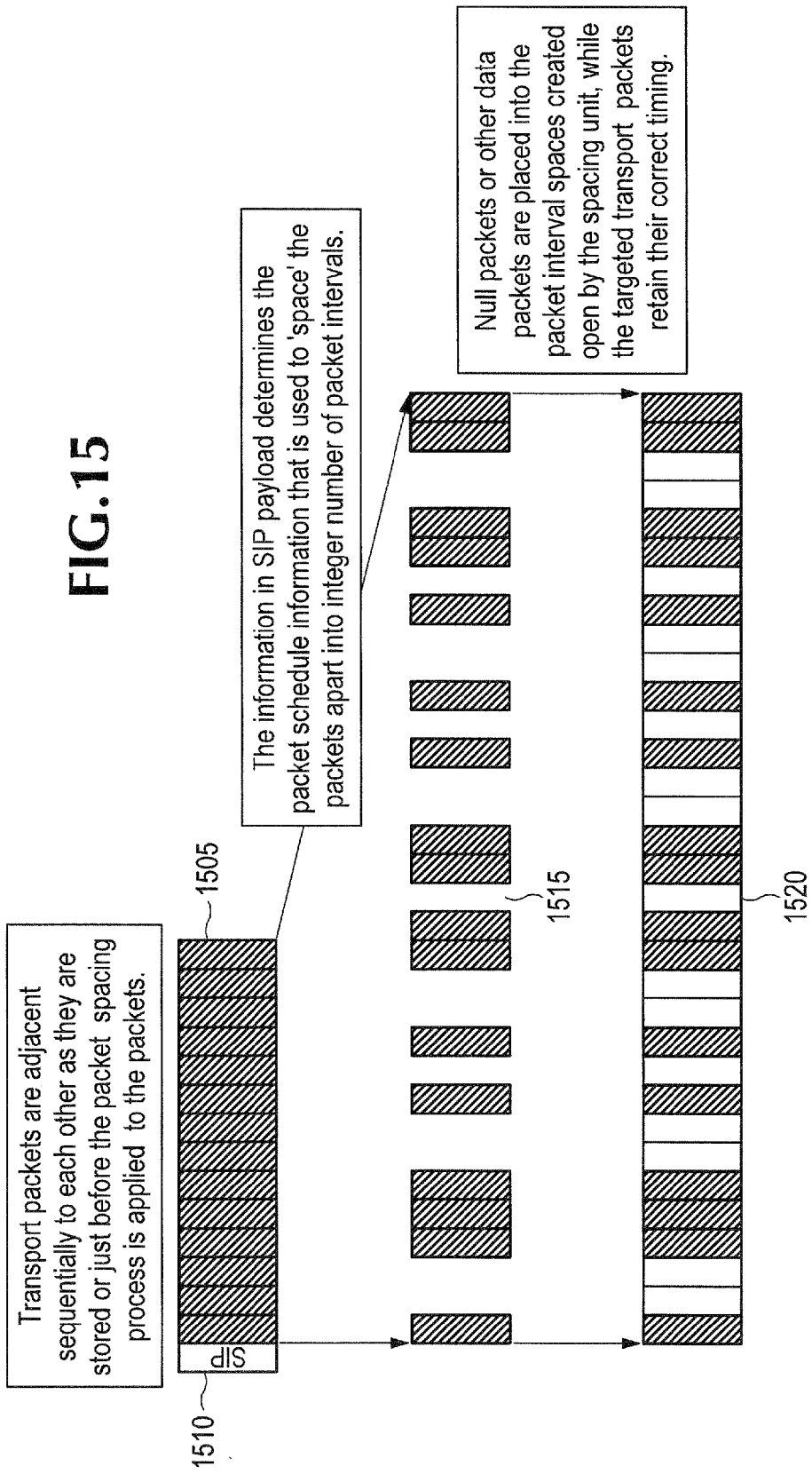
FIG. 15 is an illustration of a transport stream including timing reconstruction according to one embodiment of the present invention.

FIG. 15 is an illustration of a transport stream including timing reconstruction according to one embodiment of the present invention. In the illustrated example, multiple back-to-back transport packets 1505 are received into a buffer. An SIP 1510 is extracted that describes the packet schedule for transport packets 1505. Transport packets 1505 are spaced according to a bit pattern (e.g., "1001100101001101100101001011011") to produce a bitstream with empty packet slots 1515. Null packets 1520 or other data are placed into empty packet slots 1515 to reconstruct packet arrivals and produce an output data stream having an appropriate packet schedule. One skilled in the art will note that the timing reconstruction can be performed in real-time or on stored bitstreams. In the embodiment illustrated in FIG. 15, real-time timing reconstruction is shown, where pacing unit 1805 transmits transport packets 1505 and injects null packets 1520 to the output bitstream when the interested transport packets 1505 are to be delayed by a certain time slot.

In an embodiment of the present invention that processes stored bitstreams, the stored bitstream is input to SIP payload extractor 1310, which analyzes the bitstream to obtain the packet schedule. Packet spacing unit 1315 inserts necessary null packets according to the new packet schedule. The resulting transport stream is then stored to a storage medium, such as an optical, a magnetic, or an electronic storage device. The resulting transport stream can then be delivered from the storage device at the peak bit rate and the packet schedule within the bitstream is restored to when the SIP was originally generated.

1. Look-ahead Traffic Engineering

In an embodiment, schedule information packets (SIP) describe the packet schedules for packets ahead of the arrival time of the corresponding transport packets. That is, a packet schedule timestamp can be received at a given point of reference before the packets described by the SIP are delivered or transmitted. A point of reference can be where the stored transport packets are to be delivered to the output module for real-time delivery, or to be delivered to a real-time multiplexer. Packet schedule information can be useful for applications such as statistical multiplexing or remultiplexing, in which it is useful to know the bit rate profile of upcoming transport packets. Other benefits of having look-ahead packet scheduling is to allow for improved quality of service (QOS) in network deliveries. For example, in Internet protocol (IP) network delivery, buffering is often used in the network routers and switches. In these cases, if the network node knows ahead of time the bit rate profile of video data that will arrive at the node buffer, the network node can allocate extra buffer for the video data if its bit rate is going up to a higher value or reduce its buffer reservation otherwise. This can allow the network node to implement effectively QOS for different class of services. By intelligently provisioning the buffering with the network node using look-ahead information, there can be substantial reduction in packet loss due to buffer overflow within the network node.

Figure 16:
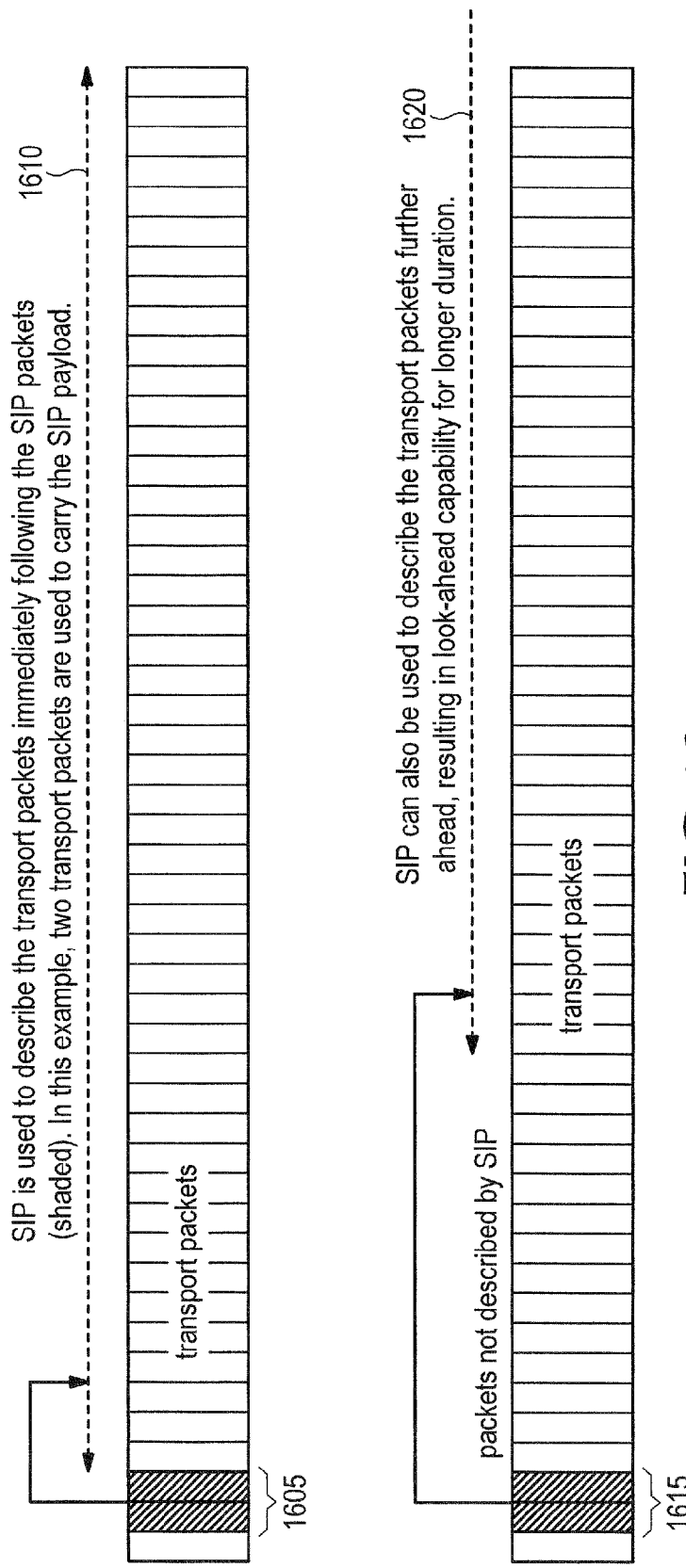
FIG. 16 is an illustration of schedule information packet description range according to embodiments of the present invention.

In one embodiment, the SIP description begins with the first transport packets following the SIP. In another embodiment, an SIP can be used to describe transport packets farther into the future. FIG. 16 is an illustration of schedule information packet description range according to embodiments of the present invention. SIP 1605 is shown to characterize transport packets 1610, which immediately follow SIP 1605. SIP 1615 illustrates look-ahead capability of a longer duration. SIP 1615 is shown to characterize transport packets 1620, which are farther ahead of SIP 1615. In an embodiment where packet scheduling is used for transmission purposes, the look-ahead capabilities of the SIP can be advantageously used by system entities to make intelligent decisions for more efficient transport or content delivery.

2. Statistical Remultiplexing Efficiency

In an embodiment, the SIP can be used for statistically remultiplexing and transmitting multiple pre-stored VBR transport streams over a CBR channel. One skilled in the art will appreciate in view of the foregoing description that look-ahead traffic engineering can be applied to multiplexer algorithms that take the bit usage assignment between different channels or data streams into consideration. A benefit of applying techniques of the present invention to remultiplexing is to utilize better the transmission channel capacity by minimizing the number of null packets in the multiplexed stream. This results in maximizing the bit rate of video and audio signals to achieve the highest presentation quality within the channel capacity constraints.

Having described preferred embodiments of packet schedule timestamp for a compressed bitstream (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

The invention claimed is:

1. A method, comprising:
   storing a plurality of packets from a data stream in a memory device;
   parsing, using a processing device, a schedule information packet from the data stream stored in the memory device;
   extracting, using the processing device, a bit pattern field from the schedule information packet; and
   temporally spacing, using the processing device, the plurality of packets stored in the memory device in response to the bit pattern field to generate a reconstructed data stream;
   wherein the data stream comprises a first bit rate; and
   wherein the parsing further comprises recalculating the bit pattern field to generate the reconstructed data stream comprising a second bit rate while preserving relative timing between the plurality of packets at the first bit rate.

2. The method of claim 1, wherein the temporally spacing further comprises delaying transmission of the reconstructed data stream.

3. The method of claim 1, wherein the temporally spacing further comprises inserting a null packet into a time slot of the reconstructed data stream.

4. The method of claim 3, further comprising storing the reconstructed data stream in the memory device.

5. A system, comprising:
   means for storing a plurality of packets from a data stream;
   means for parsing a schedule information packet from the data stream;
   means for extracting a bit pattern field from the schedule information packet;
   means for temporally spacing the plurality of packets in response to the bit pattern field to generate a reconstructed data stream; and
   means for recalculating the bit pattern field to generate the reconstructed data stream comprising a second bit rate while preserving relative timing between the plurality of packets of the data stream comprising a first bit rate.

6. The system of claim 5, wherein the means for temporally spacing further comprises means for delaying transmission of the reconstructed data stream.

7. The system of claim 5, wherein the means for temporally spacing further comprises means for inserting a null packet into a time slot of the reconstructed data stream.

8. The system of claim 5, wherein the means for storing is further configured to store the reconstructed data stream.

9. A system, comprising:
   a memory device configured to store a plurality of packets from a data stream comprising a first bit rate;
   a processing device configured to:
     extract a bit pattern field from a schedule information packet of the data stream;
     generate a reconstructed data stream by spacing the plurality of packets according to the extracted bit pattern field;
     recalculate the bit pattern field; and
     generate the reconstructed data stream comprising a second bit rate while preserving relative timing of the plurality of packets in the data stream comprising the first bit rate in response to the recalculated bit pattern field.

10. The system of claim 9, wherein the processing device is further configured to generate the reconstructed data stream by temporally spacing the plurality of packets according to the extracted bit pattern field.

11. The system of claim 10, wherein the processing device is further configured to insert a null packet into a time slot of the reconstructed data stream.

12. The system of claim 11, wherein the memory device is further configured to store the reconstructed data stream.

* * * * *

UNITED STATES PATENT AND TRADEMARK OFFICE
CERTIFICATE OF CORRECTION

| | | |
|---|---|---|
| PATENT NO. | : 8,483,230 B1 | Page 1 of 1 |
| APPLICATION NO. | : 13/365640 | |
| DATED | : July 9, 2013 | |
| INVENTOR(S) | : Zhang et al. | |

It is certified that error appears in the above-identified patent and that said Letters Patent is hereby corrected as shown below:

In the Drawings:

In Fig. 9, Sheet 8 of 17, for Tag "905", in Line 1, delete "steam" and insert -- stream --, therefor.

In Fig. 9, Sheet 8 of 17, for Tag "910", in Line 1, delete "steam" and insert -- stream --, therefor.

In the Specification:

In Column 8, Line 45, delete "video 1 305" and insert -- video 1 transport stream 305 --, therefor.

In Column 9, Line 47, delete "startcodc" and insert -- startcode --, therefor.

In Column 11, Lines 26-27, delete "offset 420)." and insert -- offset 425). --, therefor.

In Column 17, Line 43, delete "pattern 1825," and insert -- pattern 1835, --, therefor.

Signed and Sealed this
Twenty-seventh Day of May, 2014

Michelle K. Lee
*Deputy Director of the United States Patent and Trademark Office*